US011255200B2

(12) United States Patent
Whittle et al.

(10) Patent No.: US 11,255,200 B2
(45) Date of Patent: Feb. 22, 2022

(54) GAS TURBINE ENGINE WITH PRE-CONDITIONED CERAMIC MATRIX COMPOSITE COMPONENTS

(71) Applicants: Rolls-Royce plc, London (GB); Rolls-Royce High Temperature Composites Inc., Cypress, CA (US)

(72) Inventors: Michael J. Whittle, London (GB); Louise J. Gale, London (GB); Stephan J. Pattison, London (GB); Anthony G. Razzell, London (GB); Ian M. Edmonds, London (GB); Michael G. Abbott, Cypress, CA (US)

(73) Assignees: Rolls-Royce plc; Rolls-Royce High Temperature Composites Inc., Cypress, CA (US)

( * ) Notice: Subject to any disclaimer, the term of this patent is extended or adjusted under 35 U.S.C. 154(b) by 57 days.

(21) Appl. No.: 16/774,793

(22) Filed: Jan. 28, 2020

(65) Prior Publication Data
US 2021/0231019 A1    Jul. 29, 2021

(51) Int. Cl.
| | |
|---|---|
| F01D 5/28 | (2006.01) |
| F01D 5/14 | (2006.01) |
| F01D 9/04 | (2006.01) |
| C04B 35/64 | (2006.01) |

(52) U.S. Cl.
CPC ............. *F01D 5/284* (2013.01); *F01D 5/141* (2013.01); *F01D 5/282* (2013.01); *F01D 9/041* (2013.01); *C04B 35/64* (2013.01); *F01D 5/288* (2013.01); *F05D 2240/12* (2013.01); *F05D 2260/941* (2013.01); *F05D 2300/6033* (2013.01)

(58) Field of Classification Search
CPC ...................................................... F01D 5/284
See application file for complete search history.

(56) References Cited

U.S. PATENT DOCUMENTS

| | | | |
|---|---|---|---|
| 7,735,363 | B2 | 6/2010 | Mainville |
| 8,172,519 | B2 | 5/2012 | Jarrabet et al. |
| 9,114,496 | B2 | 8/2015 | Saunders et al. |
| 9,341,412 | B2 | 5/2016 | Luthra |
| 9,975,815 | B2 | 5/2018 | Steibel |
| 10,113,936 | B2 | 10/2018 | Ronan et al. |
| 2007/0110583 | A1 | 5/2007 | McMillan |
| 2010/0068034 | A1 | 3/2010 | Schiavo |
| 2012/0076927 | A1 | 3/2012 | Bhatt et al. |

(Continued)

FOREIGN PATENT DOCUMENTS

| | | |
|---|---|---|
| EP | 1832714 A1 | 9/2007 |
| EP | 2500519 A2 | 9/2012 |

(Continued)

OTHER PUBLICATIONS

Partial EP Search Report completed by the European Patent Office on Mar. 26, 2021 and issued in connection with EP Application No. 21150175.4.

*Primary Examiner* — Nathaniel Herzfeld
(74) *Attorney, Agent, or Firm* — Barnes & Thornburg LLP

(57) ABSTRACT

A method of treating a component adapted for use in a gas turbine engine is described herein. The component may comprise ceramic matrix composite materials. The treatment to the ceramic matrix composite component may reduce or eliminate the wear or damage of crack propagation in the ceramic matrix composite component.

16 Claims, 10 Drawing Sheets

(56) References Cited

U.S. PATENT DOCUMENTS

| | | | | |
|---|---|---|---|---|
| 2012/0266603 | A1* | 10/2012 | Uskert | B32B 5/24 |
| | | | | 60/772 |
| 2015/0147184 | A1* | 5/2015 | de Diego | C04B 35/65 |
| | | | | 416/229 A |
| 2017/0101873 | A1* | 4/2017 | Morgan | C04B 35/573 |
| 2017/0362943 | A1* | 12/2017 | Pearson | F01D 5/282 |
| 2018/0347391 | A1 | 12/2018 | Lewis et al. | |
| 2019/0271234 | A1* | 9/2019 | Campbell | F01D 5/284 |
| 2019/0283271 | A1* | 9/2019 | Tsuru | C04B 38/0074 |
| 2019/0376389 | A1* | 12/2019 | Roberts | F01D 5/005 |
| 2020/0080425 | A1* | 3/2020 | Weaver | F01D 5/147 |

FOREIGN PATENT DOCUMENTS

| | | |
|---|---|---|
| EP | 3173583 A1 | 5/2017 |
| EP | 3255252 A1 | 12/2017 |
| GB | 2542263 A | 3/2017 |

* cited by examiner

GAS TURBINE ENGINE WITH PRE-CONDITIONED CERAMIC MATRIX COMPOSITE COMPONENTS

FIELD OF THE DISCLOSURE

The present disclosure relates generally to gas turbine engines, and more specifically to treated or conditioned ceramic matrix composite components for use with gas turbine engines and methods for providing the same.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Products of the combustion reaction directed into the turbine are directed toward airfoils included in stationary vanes and rotating blades of the turbine. Shrouds are arranged around the rotating blades to direct the gases through the engine. Components gas turbine engines are often made from high-temperature resistant materials and/or are actively cooled by supplying relatively cool air to the components due to the high temperatures of the combustion products. To this end, some components are incorporating composite materials adapted to withstand very high temperatures. Design and manufacture of components made from composite materials presents challenges because of the geometry and strength desired for the components.

SUMMARY

The present disclosure may comprise one or more of the following features and combinations thereof.

A method of treating a component adapted for use in a gas turbine engine may include several steps. The method may include providing a component comprising ceramic matrix composite materials and treating the component to provide a treated ceramic matrix composite component to limit the formation of failure inducing cracks in the component during use of the component in the gas turbine engine, thus increasing the life expectancy of the component in the gas turbine engine.

In some embodiments, the treating step may include at least one of applying a mechanical load to a surface of the component according to a predetermined force schedule and applying heat to the component according to a predetermined heating schedule. In some embodiments, the method may further comprise applying heat to the component during the step of applying the mechanical load to the surface of the component.

In some embodiments, the step of applying the mechanical load to the component may include applying a solid tool to the component. In some embodiments, the step of applying the mechanical load to the component may include applying a pressurized fluid to the component. The application of the mechanical load using the solid tool or the pressurized fluid may provide at least one of discrete forces to a plurality of points on the surface of the component and distributed forces over an area of the surface of the component.

In some embodiments, the method may further include removing material from the surface of the component after the step of applying the mechanical load to the surface of the component. In some embodiments, the method may further include applying an environmental barrier coating to the surface of the component after the step of applying the mechanical load to the surface of the component.

In some embodiments, the method may further include installing the treated ceramic matrix composite component into the gas turbine engine. The treated ceramic matrix composite component may be installed after the step of applying the mechanical load to the surface of the component.

In some embodiments, the predetermined force schedule may include repeating cycles of increasing and decreasing a force applied to the surface of the component. The force applied to the component may be increased to a predetermined maximum force.

In some embodiments, the step of decreasing the force applied to the surface of the component includes decreasing the force to a zero value. In some embodiments, the predetermined force schedule may include increasing a force applied to the surface of the component to a predetermined maximum force in a series of predetermined incremental steps.

In some embodiments, the method may further include installing the component into the gas turbine engine before the step of applying the mechanical load to the surface of the component. In some embodiments, the step of applying the mechanical load to the surface of the component may be performed by operating the gas turbine engine.

In some embodiments, the predetermined force schedule may be performed by varying a fuel flow rate of the gas turbine engine. In some embodiments, the predetermined force schedule may be performed by varying an engine pressure ratio of the gas turbine engine.

In some embodiments, the method may further include performing an engine pass-off procedure. The engine pass-off procedure may include an engine start and stabilization period, a treating period, a running-in period, and a decremental pass-off period. In some embodiments, the step of applying the mechanical load to the surface of the component may be performed during the engine pass-off procedure.

In some embodiments, a speed of the gas turbine engine may be within a first range during the engine start and stabilization period. The first range may have a first maximum speed value.

In some embodiments, the speed of the gas turbine engine may be within a second range during the treating period. The second range may have a second maximum speed value.

In some embodiments, the speed of the gas turbine engine may be within a third range during the running-in period. The running-in period may have a third maximum speed value. In some embodiments, the third maximum speed value of the third range may be greater than the second maximum speed value of the second range.

In some embodiments, the second maximum speed value of the second range may be equal to the first maximum speed value of the first range. In some embodiments, the second maximum speed value of the second range may be greater than the first maximum speed value of the first range and less than the third maximum speed value of the third range.

In some embodiments, the step of preforming the engine pass-off procedure may have a predetermined run time. In some embodiments, the predetermined run time may be at least 100 minutes.

In some embodiments, the method may further include repeating cycles of increasing and decreasing the speed of the gas turbine engine. The speed of the engine may be increased to the second maximum speed value and decreased within the second range during the treating period of the engine pass-off procedure According to another aspect of the present disclosure, a component adapted for use in a gas turbine engine may include a body comprising ceramic matrix composite material and a strain concentration feature. The body may have a peak-stress region and an off-peak stress region. The strain concentration feature may be located at the off-peak stress region. The strain concentration feature may also be configured to cause stresses to form in the off-peak stress region instead of at the peak-stress region to reduce stress at the peak-stress region.

In some embodiments, the body may include an outer platform, an inner platform, and an airfoil. The outer platform may extend circumferentially at least partway about an axis and define an outer boundary of a gas path of the gas turbine engine. The inner platform may be spaced apart radially from the outer platform relative to the axis. The inner platform may extend at least circumferentially partway about the axis and define an inner boundary of the gas path. The airfoil may extend radially between the outer platform and the inner platform.

In some embodiments, the stain concentration feature may be located on the outer platform outside of the gas path. In some embodiments, the strain concentration feature may be located on the inner platform outside of the gas path In some embodiments, the body may include a blade track shroud segment. The blade track shroud segment may have a shroud wall that extends circumferentially at least partway about an axis and a mount post that extends radially outward from an outer surface of the shroud wall. In some embodiments, the strain concentration feature may be located on the mount post and along the outer surface of the shroud wall.

These and other features of the present disclosure will become more apparent from the following description of the illustrative embodiments.

DETAILED DESCRIPTION OF THE DRAWINGS

Figure 1:
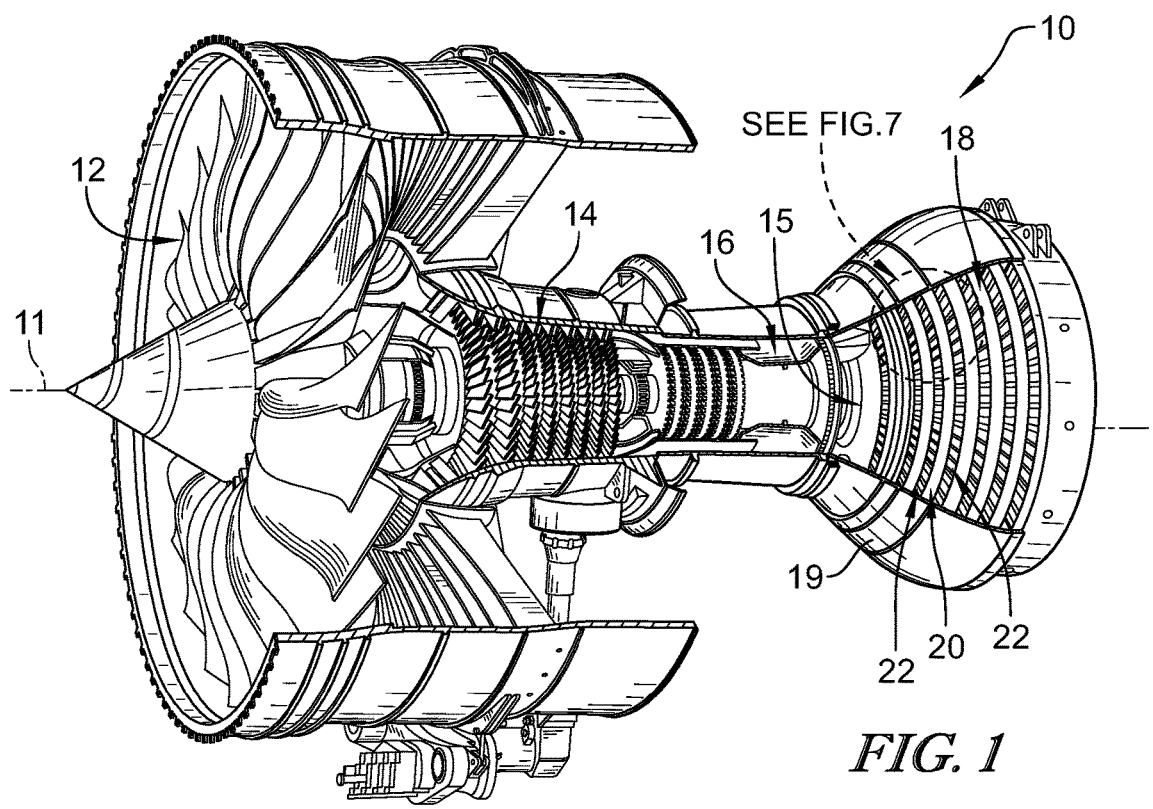
FIG. 1 is a cutaway view of a gas turbine engine that includes a fan, a compressor, a combustor, and a turbine, the turbine including rotating wheel assemblies configured to rotate about an axis of the engine and static turbine vane rings configured to direct air into downstream rotating wheel assemblies.

For the purposes of promoting an understanding of the principles of the disclosure, reference will now be made to a number of illustrative embodiments illustrated in the drawings and specific language will be used to describe the same.

Figure 2:
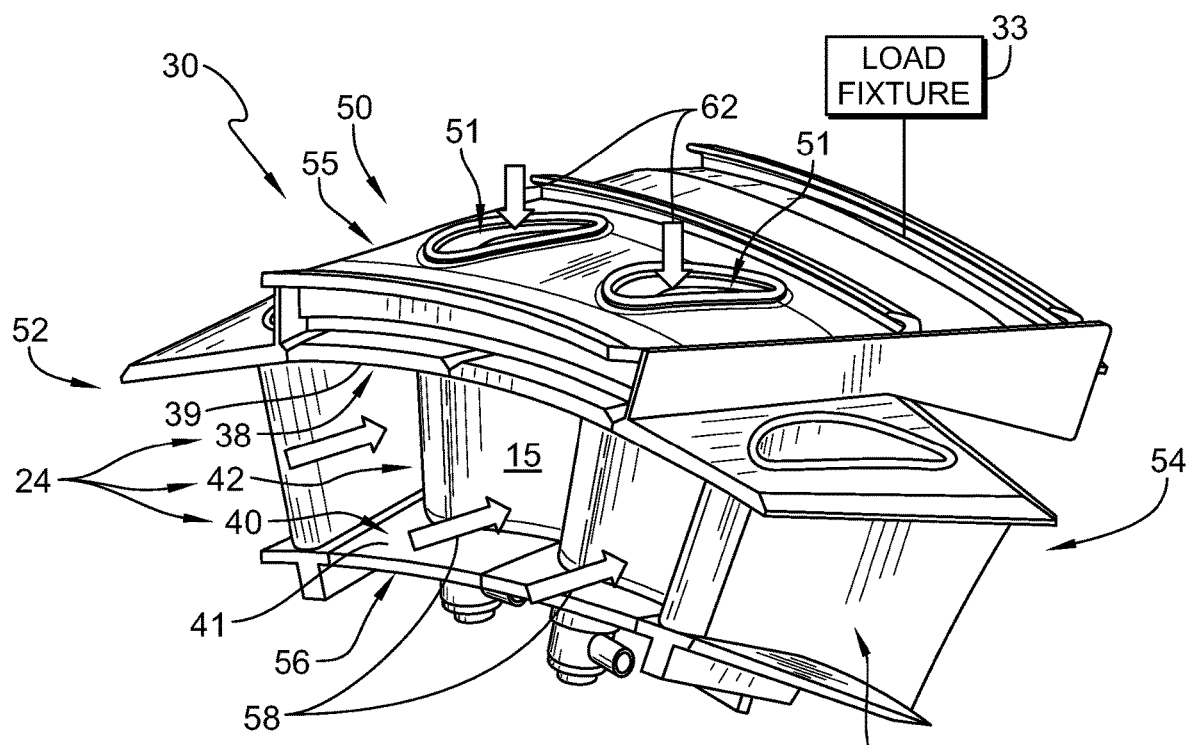
FIG. 2 is a perspective view of ceramic matrix composite turbine vanes adapted for use in the static turbine vane rings of the gas turbine engine of FIG. 1 assembled on a metallic support structure for supporting the ceramic matrix composite turbine vanes during a treatment process that includes applying a mechanical load and heat to a surface of the ceramic matrix composite turbine vanes to limit the formation of failure inducing cracks in the turbine vanes.

A component 24 adapted for use in a gas turbine engine 10 is shown in FIG. 2. The gas turbine engine 10 includes a fan 12, a compressor 14, a combustor 16, and a turbine 18 as shown in FIG. 1. The fan 12 is driven by the turbine 18 and provides thrust for propelling an air vehicle. The compressor 14 compresses and delivers air to the combustor 16. The combustor 16 mixes fuel with the compressed air received from the compressor 14 and ignites the fuel. The hot, high-pressure products of the combustion reaction in the combustor 16 are directed into the turbine 18 to cause the turbine 18 to rotate about a central axis 11 and drive the compressor 14 and the fan 12. In other embodiments, the fan 12 may be omitted and replaced with a propeller, turboshaft, or the like.

Figure 7:
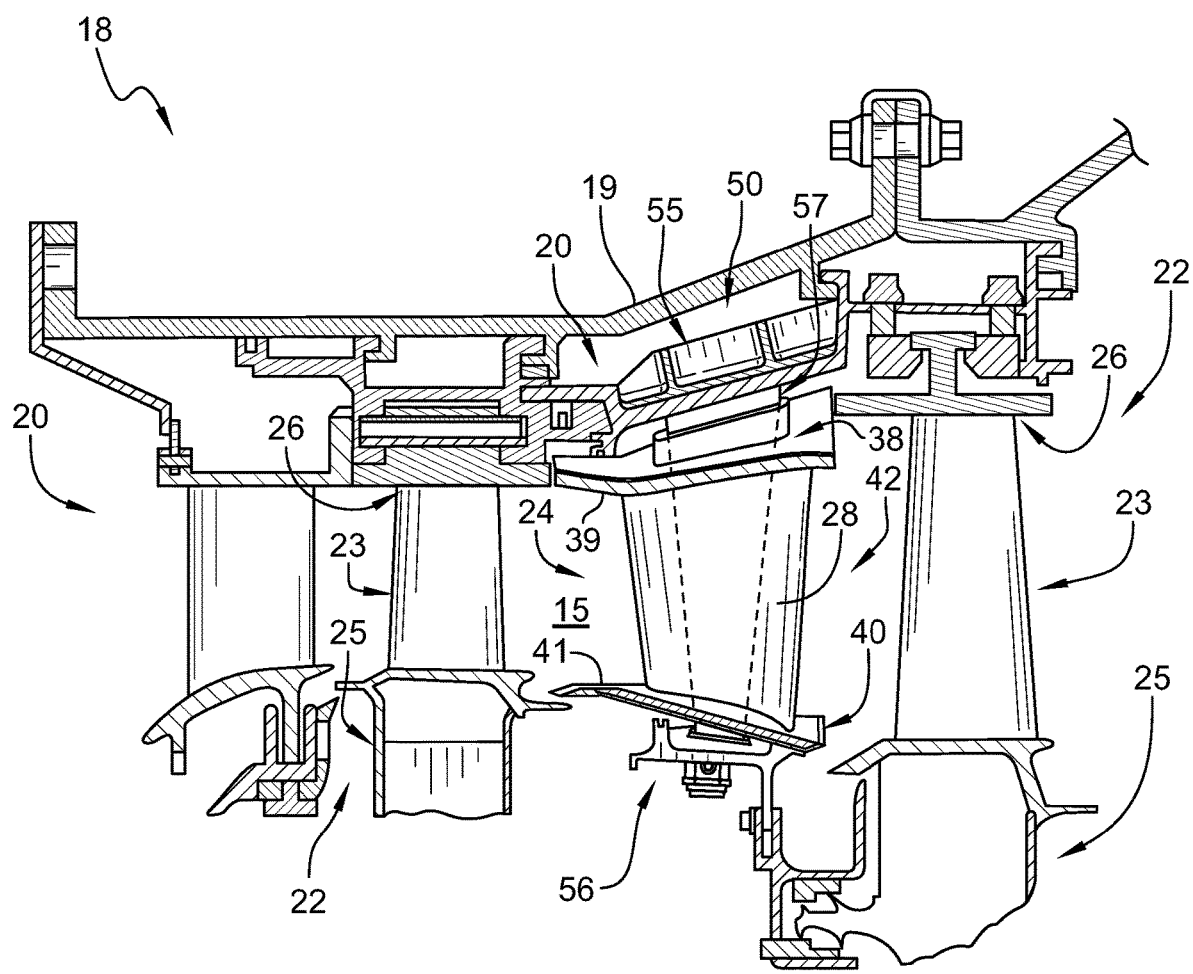
FIG. 7 is a cross section view of the turbine of the gas turbine engine of FIG. 1 showing the static turbine vane rings are positioned axially between the rotating wheel assemblies and suggesting that the treatment process includes mechanical loading and heating untreated ceramic matrix composite turbine vanes by operation of the gas turbine engine according to predetermined force and heat schedule as shown in FIGS. 10-14.

The turbine 18 includes a turbine case 19, a plurality of static turbine vane rings 20 that are fixed relative to the axis 11, and a plurality of bladed rotating wheel assemblies 22 as shown in FIGS. 1 and 7. Each turbine vane ring 20 includes a plurality of turbine vanes 24 that are positioned to direct the gases through the gas path 15 toward the bladed wheel assemblies 22 with a desired orientation. Each of the bladed wheel assemblies 22 includes a plurality of blades 23 coupled to a rotor disk 25 for rotation therewith and a turbine shroud 26 coupled to the turbine case 19. The hot gases interact with turbine blades 23 of the bladed wheel assemblies 22 to cause the bladed wheel assemblies 22 to rotate about the axis 11. The turbine shroud 26 extends around the turbine blades 23 to block gases from passing over the turbine blades 23 during use of the turbine 18 in the gas turbine engine 10.

In some embodiments, the components of the gas turbine engine 10, i.e. the turbine blades 23, the turbine vanes 24, and the turbine shrouds 26, may comprise ceramic matrix composite materials. The ceramic matrix composite material of the components 24, 26 is adapted to withstand high temperatures, but may have a relatively low strength compared to the metallic materials of other components within the engine 10. As such, the ceramic matrix composite components may be susceptible to failure caused by fatigue cracks. Additional components in the gas turbine engine may comprise ceramic matrix composite materials and may be treated as described herein. Such components may include, without limitation, combustor liners and other combustor components and compressor blades, vanes, and shrouds, and afterburner liners and components.

To limit the formation of failure inducing cracks in the ceramic matrix composite components 24, 26 during use of the components 24, 26 in the gas turbine engine 10, the present disclosure teaches a method of treating the component 24, 26 before use in the gas turbine engine 10 at maximum mechanical loading. In some embodiments, the component is treated before assembly into the gas turbine engine. In some embodiments, the component is treated in the assembled gas turbine engine in a process whereby the gas turbine engine is operated at a defined schedule and, thus, treat the component before the gas turbine engine enters service or is operated at maximum output. The method includes applying a mechanical load to a surface 28 of the component according to a predetermined force schedule to provide a treated ceramic matrix composite component as shown in FIGS. 2-5. The treated ceramic matrix composite component may have an increased life expectancy compared to an untreated or as formed ceramic matrix composite component.

In the illustrative embodiments, heat is also applied simultaneously to the component 24, 26 according to a predetermined heating schedule. In other embodiments, the heat may be applied before or after the mechanical load. The heat applied to the ceramic matrix composite component 24, 26 may help treat the ceramic matrix composite materials of the components 24, 26 so as to limit the formation of failure inducing cracks during use of the components 24, 26 in the gas turbine engine 10.

Figure 3:
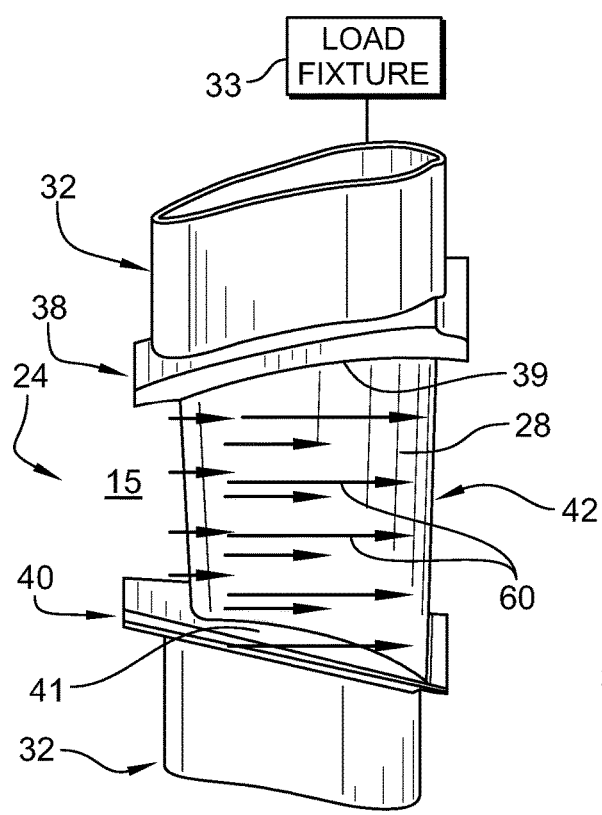
FIG. 3 is perspective view of one of the turbine vanes for use in the gas turbine engine of FIG. 1 showing the turbine vane is supported by mounting supports and the treatment process includes applying the mechanical load discretely in a plurality of points on or distributed across the surface of the turbine vane.
Figure 4:
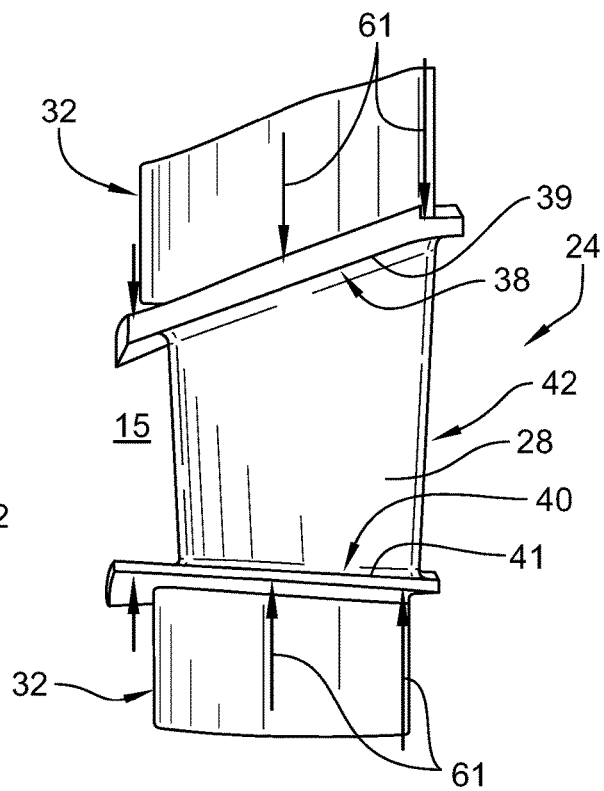
FIG. 4 is a perspective view of the turbine vane of FIG. 3 showing the turbine vane is treated by applying the mechanical load discretely in a plurality of points or distributed across an outer and inner platforms of the turbine vane.
Figure 5:
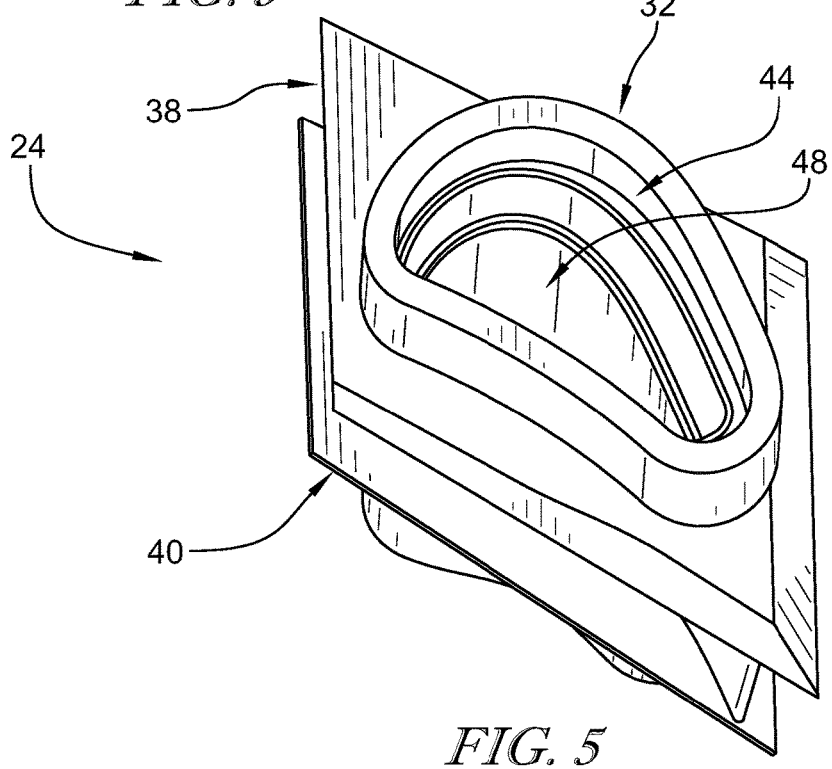
FIG. 5 is a top view of the turbine vane of FIG. 4 showing that the turbine vane is treated by pressurizing an interior cavity of the turbine vane to apply the mechanical load to the turbine vane.

In the illustrative embodiments, the treating of the components 24, 26 may be performed prior to installation in the gas turbine engine 10 as suggested in FIGS. 2-5 or after installation in the gas turbine engine 10 as suggested in FIGS. 7 and 10-14. In the pre-installation embodiments, the turbine vane 24, or the blade track shroud 26 may be assembled on the associated support structure 50 and put in a load-test frame 30 as shown in FIG. 2. In other embodiments, the turbine vane 24 may be supported by mounting supports 32 as shown in FIGS. 3-5.

The turbine vane 24 includes an outer platform 38, an inner platform 40, an airfoil 42, an outer mount 44, and an inner mount 46 as shown in FIG. 2-5. The outer platform 38 defines an outer boundary surface 39 of the gas path 15, while the inner platform 40 is spaced apart radially from the outer platform 38 to define an inner boundary surface 41 of the gas path 15. The airfoil 42 extends radially between the outer platform 38 and the inner platform 40 and is configured to guide the hot gases flowing through the gas path 15 within the gas turbine engine 10. The outer mount 44 extends radially away from the outer platform 38, while the inner mount 46 extends radially away from the inner platform 40.

In the illustrative embodiment, the turbine vanes 24 are assembled on the associated support structure 50 as shown in FIG. 2. The support structure 50 comprises metallic materials and is configured to support the turbine vane 24 in a similar manner as if the turbine vane 24 was installed in the gas turbine engine 10.

The load-test frame 30 includes a load fixture 33 and sealing components 52, 54 as shown in FIG. 2. The load fixture 33 is configured to support the assembled turbine vanes 24 and support structure 50 during the application of the mechanical loading and/or heat. The sealing components 52, 54 are shaped to form adjacent vanes on either side of the ceramic turbine vane 24 to seal the turbine vanes 24 assembled on support structure 50. The gas path 15 is formed by the platforms 38, 40, the airfoil 42, and the seals 52, 54.

In the illustrative embodiment, the sealing components 52, 54 are made from metallic materials. In other embodiments, the sealing components 52, 54 may be made from ceramic matrix composite materials or another suitable material.

The support structure 50 includes an outer carrier 55, an inner carrier 56, and a support spar 57 as shown in FIGS. 2 and 7. The outer carrier 55 is arranged radially outward of the turbine vane 24 and extends at least partway circumferentially about the axis 11. The outer carrier 55 is coupled to the load fixture 33 to support the assembled turbine vanes 24 and support structure 50 for treatment as suggested in FIG. 2, but is coupled to the turbine case 19 when installed in the engine 10. The support spar 57 extends radially inward from the outer carrier 55 through an interior cavity 48 of the corresponding turbine vane 24 and is configured to receive force loads applied to the vane 24 by the mechanical load. The inner carrier 56 is arranged radially inward of the turbine vane 24 and extends at least partway circumferentially about the axis 11. The inner carrier 56 couples to the support spar 57 to locate the turbine vane 24 radially therebetween.

In the illustrative embodiments, at least two turbine vanes 24 are mounted on the support structure 50 as shown in FIG. 2. In other embodiments, the support structure 50 holds only one turbine vane 24. In some embodiments, the support structure 50 may hold as may turbine vanes 24 as the support structure 50 is configured to hold.

In some embodiments, the load-test frame 30 may further include a forward and aft sealing elements. The forward and aft sealing elements may be plates that extend between the sealing elements 52, 54 on both the forward and aft side of the turbine vanes 24 with respect to the axis 11. The forward and aft sealing elements may engage the turbine vanes 24 mounted on the support structure 50 and the sealing elements 52, 54 on a forward side and an aft side to seal the entire assembly of the turbine vanes 24 and support structure 50 and create the pressure gradient over the platforms 38, 40 of the turbine vanes 24.

The turbine vanes 24 are arranged on the support structure 50 so that load transfer features on the support structure 50 engage the turbine vane 24 to transfer loading when the mechanical load and heat is applied to the turbine vanes 24. The sealing components 52, 54 are coupled to exposed circumferential ends of the turbine vane or vanes 24 to seal the gas path 15. In the illustrative embodiment, the sealing components 52, 54 are configured to act as adjacent turbine vanes to simulate similar loading as if the turbine vanes 24 were installed in the engine 10.

In pre-installation embodiments, to apply the mechanical load to the component 24, 26, the method includes pneumatically loading the turbine vanes 24 on the support structure 50. Relatively high pressure air is run through the gas path 15 of the assembled turbine vanes 24 assembled on the support structure 50 as suggested by arrows 58 in FIG. 2. The high pressure air applies the mechanical loading to the surface 28 of the vane 24 and causes the turbine vane 24 to engage the load transfer features of the support structure 50. The engagement of the load transfer features stresses the turbine vane 24 in a similar manner as if the turbine vane 24 was installed in the gas turbine engine 10.

Additionally, the high pressure air may also be fed through the channels 51 of the support structure 50 as suggested by arrows 62 in FIG. 2. The high pressure air pressurizes the interior cavity 48 of the vane 24, simulating the pressure drops across the airfoil 42. The high pressure air also loads any seals between the vane 24 and the support structure 50. In the illustrative embodiment, the high pressure air flow 62 has a relatively higher pressure than the pressure of the air flow 58. The high pressure air 58, 62 may also be hot in temperature to apply the heat to the surface of the component 24 as well In other embodiments, the mechanical load may be applied by discretely applying forces to a plurality of points 60 on the surface 28 of the component 24, 26 as shown in FIG. 3. In some embodiments, a whiffle tree may be used to simulate the distributed mechanical load along the plurality of points 60 on the surface 28. The whiffle tree is a mechanism configured to distribute load in a defined way across multiple points, approximating the effect of a continuous load distribution.

Such application of the mechanical load may be applied to the airfoil 42 of the turbine vanes 24 when assembled on the support structure 50. In other embodiments, the mechanical load is applied to the component 24 in the universal testing machine 33 using the whiffle tree to discretely apply the mechanical load to the plurality of points 60 as shown in FIG. 3.

In other embodiments, the mechanical load may be applied to the surface 28 of the component 24 by distributing force over a predetermined area of the surface 28 of the component 24. The force may be applied discretely or distributed over an area of the surface using pressurized fluid such as, for example, pressurized (and optionally heated) air. In other embodiments, inflatable bladders are used to apply forces to the components.

In some embodiments, the mechanical load may be applied by discretely applying force to a plurality of points 61 on the platforms 38, 40 of the vane 24 outside of the gas path 15 as shown in FIG. 4. In other embodiments, the mechanical load may be applied to the interior cavity 48 of the vane 24 by pressurizing the interior cavity 48 as shown in FIG. 5. The interior cavity 48 may be pressurized directly with high pressure air or with a pressurized inflatable bladder that is inserted into the cavity 48.

In such embodiments, the outer and inner vane mounts 44, 46 are supported by the mounting supports 32 as shown in FIGS. 3-5. The outer and inner vane mounts 44, 46 each extend into a corresponding mounting support 32. The mounting supports 32 are coupled to the load fixture 33 to hold the vane 24 in place as suggested in FIGS. 3-5. In the illustrative embodiments, of FIGS. 3-5, the load fixture 33 may be a universal testing machine 33 that directly contacts the surface of the component 24.

Figure 6:
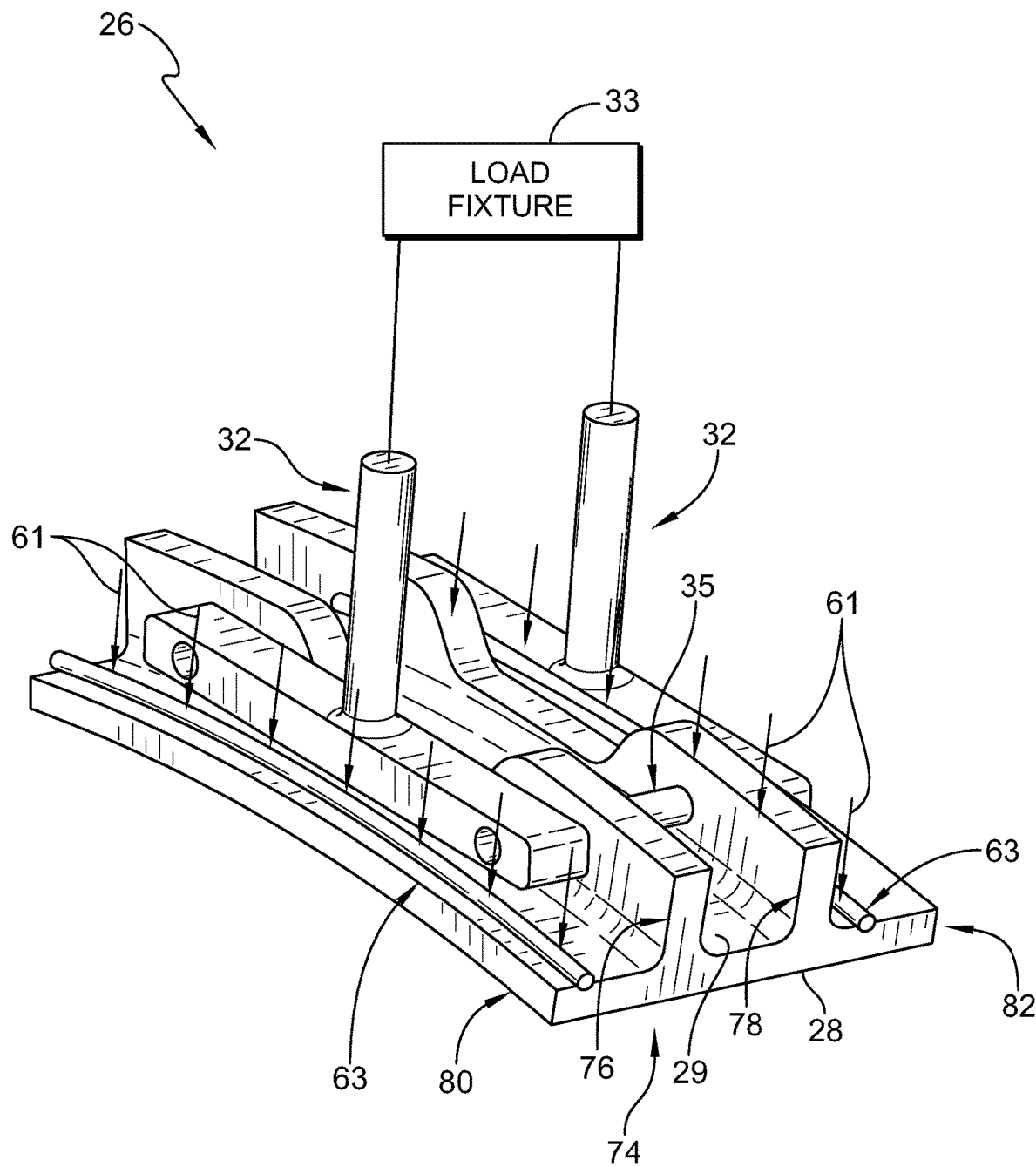
FIG. 6 is a perspective view of a ceramic matrix composite blade track segment adapted for use in the rotating wheel assemblies of the gas turbine engine of FIG. 1 showing the blade track segment is supported by mounting supports and the treatment process includes applying the mechanical load by discretely in a plurality of points on or distributed across the surface of the blade track segment.

In the illustrative embodiment of FIG. 6, the blade track segment 26 is supported by the mounting supports 32 so that the mechanical load may be applied to the shroud wall 74 of the blade track segment 26. The mechanical load may be a plurality of points 61 on the shroud wall 74. In some embodiments, the mechanical load may be a line contact 63 that extends circumferentially along the shroud wall 74 as shown in FIG. 66.

In the illustrative embodiment, the blade track segment 26 includes the shroud wall 74 and mount posts 76, 78 as shown in FIG. 6. The shroud wall 74 extends circumferentially at least partway about the axis 11 and has an inner surface 28 that defines a portion of the gas path 15. Each mount post 76, 78 extends radially outward from an outer surface 29 of the shroud wall 74. The second mount post 78 is spaced apart axially from the first mount post 76 in the illustrative embodiment.

The mounting supports 32 are coupled to the blade track segment 36 by a pin 35 that extends through one mount support 32 located on a forward side 80 of the blade track segment 26 axially forward of the mount post 76, through the mount posts 76, 78 of the blade track segments 26, and another mount support 32 located on an aft side 82 of the blade track segments axially aft of the mount post 78. The mounting supports 32 are coupled to the load fixture 33 as shown in FIG. 6.

In the illustrative embodiment, the mechanical load is applied to the outer surface 29 of the shroud wall 74 on the forward and aft sides 80, 82 of the shroud wall 74. In other embodiments, the mechanical load may be applied to other suitable areas of the blade track segment 26.

The predetermined force schedule for applying the mechanical load includes repeating cycles of increasing and decreasing the forces and/or heat applied to the surface 28 of the component 24. The forces applied to the surface 28 of the component 24 is increased to a predetermined maximum force, while the heat applied to the component 24 is increased to a predetermined maximum temperature. The predetermined maximum force and the predetermined maximum temperature are less than the forces and heat experienced by the component 24 during peak engine operation.

In some embodiments, the step of decreasing the force applied to the surface 28 of the component 24 includes decreasing the force to a zero value. In other embodiments, the forces may be decreased to a predetermined minimum force that is greater than zero. Similarly, the step of decreasing the heat applied to the component 24 includes decreasing the heat to a zero value. In other embodiments, the heat may be decreased to predetermined minimum temperature.

In other embodiments, the predetermined force schedule includes increasing the force applied to the surface 28 of the component 24 to the predetermined maximum force in a series of incremental steps of a predetermined force increment. At each step, the force applied to the surface 28 of the component 24 may be held for a first predetermined set of time before the force is increased.

In some embodiments, the number of incremental steps may be at least three steps. In other embodiments, the number of incremental steps may be at least four steps. In some embodiments, the number of incremental steps may be any suitable number of steps until the predetermined maximum force is reached.

In some embodiments, the predetermined force schedule includes decreasing the force applied to the surface of the component between each incremental increase. The force may be decreased to a zero value in some embodiments. In other embodiments, the force is decreased to the predetermined minimum force. After each decreasing step, the force applied to the surface 28 of the component 24 may be held for a second predetermined set of time before the force is increased again.

In the illustrative embodiment, the second predetermined set of time is less than the first predetermined set of time. In other embodiment the first predetermined set of time may be equal to the second predetermined set of time.

In the illustrative embodiment, the method of treating the component 24 further includes removing material from the surface 28 of the component 24 and applying an environmental barrier coating to the surface 28 of the component 24. After the component 24 is formed and infiltrated, the component 24 may be machined to form the as needed features for assembly in the engine 10. The material may be removed and the coating applied after the mechanical load has been applied to the surface 28 of the component 24. In other embodiments, the material removal and coating steps may be performed before the mechanical loading is applied to the surface 28.

In post-installation embodiments, the application of the mechanical load to the surface 28 of the component 24, 26 is performed by operating the gas turbine engine 10 with the component 24, 26 installed in the engine 10 as suggested in FIG. 7. In some embodiments, the predetermined force schedule and the predetermined heating schedule are performed by varying at least one of a fuel flow rate of the engine 10 and engine pressure ratios of the engine 10.

In other embodiments, the method further includes performing an engine pass-off procedure 64 to apply the mechanical load to the surface 28 of the component 24 as shown in FIGS. 10-14. The engine pass-off procedure 64 includes the predetermined force and heating schedules.

The engine pass-off procedure 64 includes an engine start and stabilization period 66, a treating period 68, a running-in period 70, and a decremental pass-off period 72 as shown in FIGS. 10-14. During the treating period 68 of engine pass-off procedure 64, a speed of the engine 10 is increased and decreased to increase and decrease the mechanical load and heat applied to the surface 28 of the component 24.

During the start and stabilization period 66, the engine 10 is started from a zero value $S_0$ to a minimum speed value $S_1$ as shown in FIGS. 10-14. For the remaining duration of the start and stabilization period 66, the speed of the engine 10 is within a first range between the minimum speed value S and a first maximum speed value $S_1$. The minimum speed value S is a low idle of the engine 10, while the first maximum speed value $S_1$ is a high idle of the engine 10.

The start and stabilization period 66 has a run time from $t_0$ to $t_1$ as shown in FIGS. 10-14. In the illustrative embodiment, the run time for the start and stabilization period 66 is about twenty minutes. In some embodiments, the run time for the start and stabilization period may be less than or greater than 20 minutes. In other embodiments, the run time for the start and stabilization period may be another suitable period of time.

Once the engine 10 is started, the speed of the engine 10 is held at the minimum speed value S or a low idle for a first predetermined period of time to stabilize the engine 10. After the engine 10 is stabilized at low idle, the speed of the engine 10 is increased to the first maximum speed value $S_1$ or a high idle and maintained for a second predetermined period of time that may be less than, equal to, or greater than the first predetermined period of time. Then, the speed is decreased back to the minimum speed value S and maintained for a third predetermined period of time that may be less than, equal to, or greater than the first predetermined period of time and the second predetermined period of time.

Figure 11:
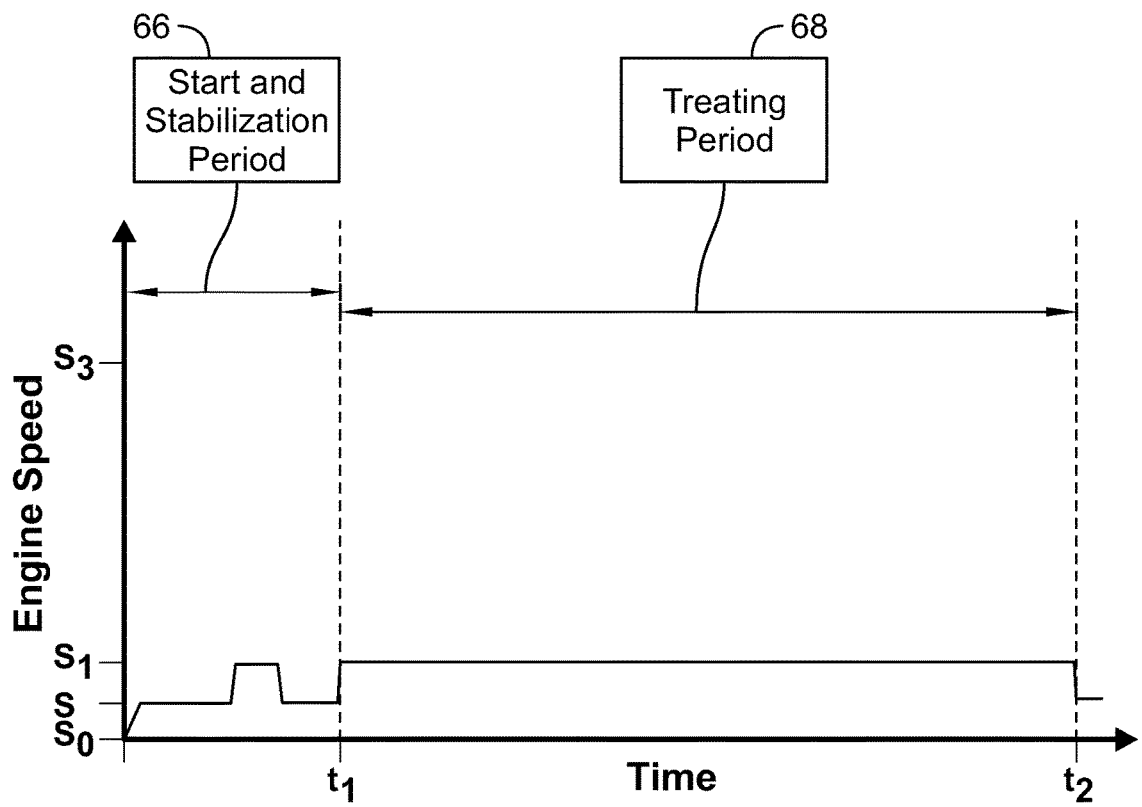
FIG. 11 is a graph of the engine pass-off procedure of FIG. 10 showing an embodiment of the treating period that includes maintaining the speed of the engine at a first maximum speed value.
Figure 12:
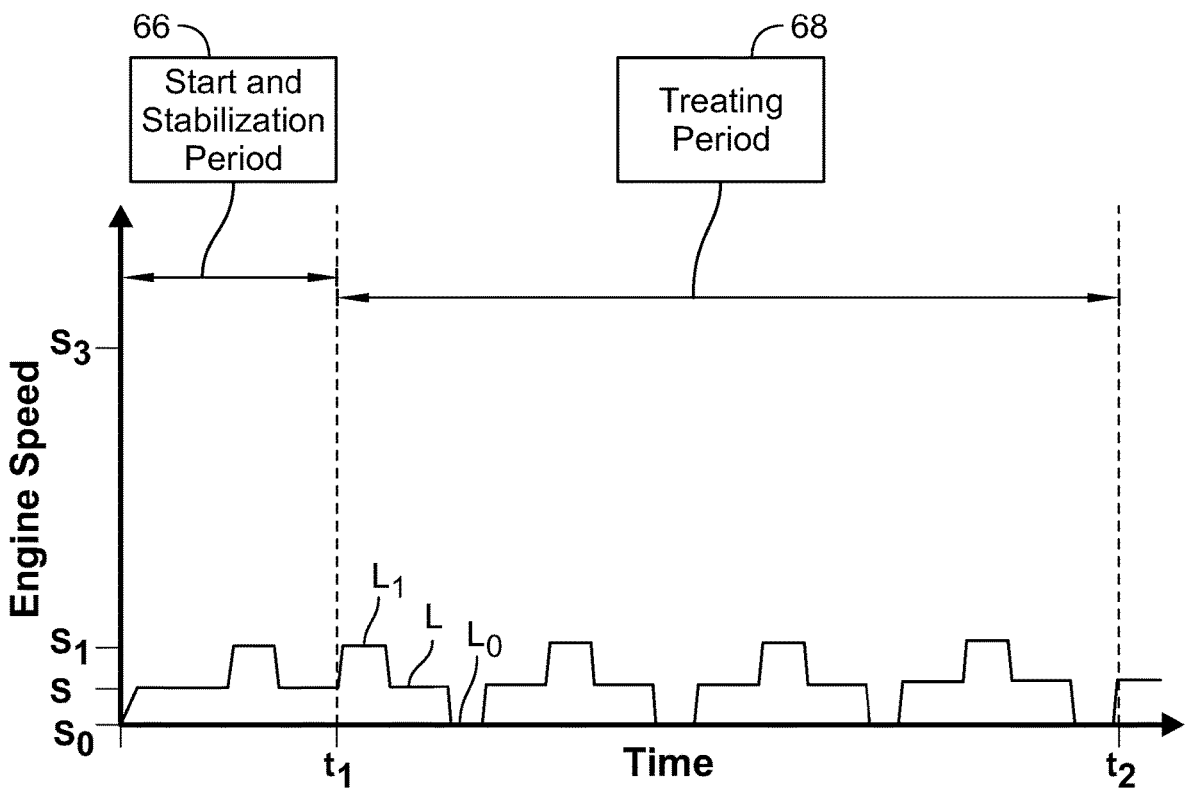
FIG. 12 is a graph of the engine pass-off procedure of FIG. 10 showing another embodiment of the treating period that includes cycles of increasing and decreasing the speed of the engine between the first maximum speed value and a zero value.
Figure 13:
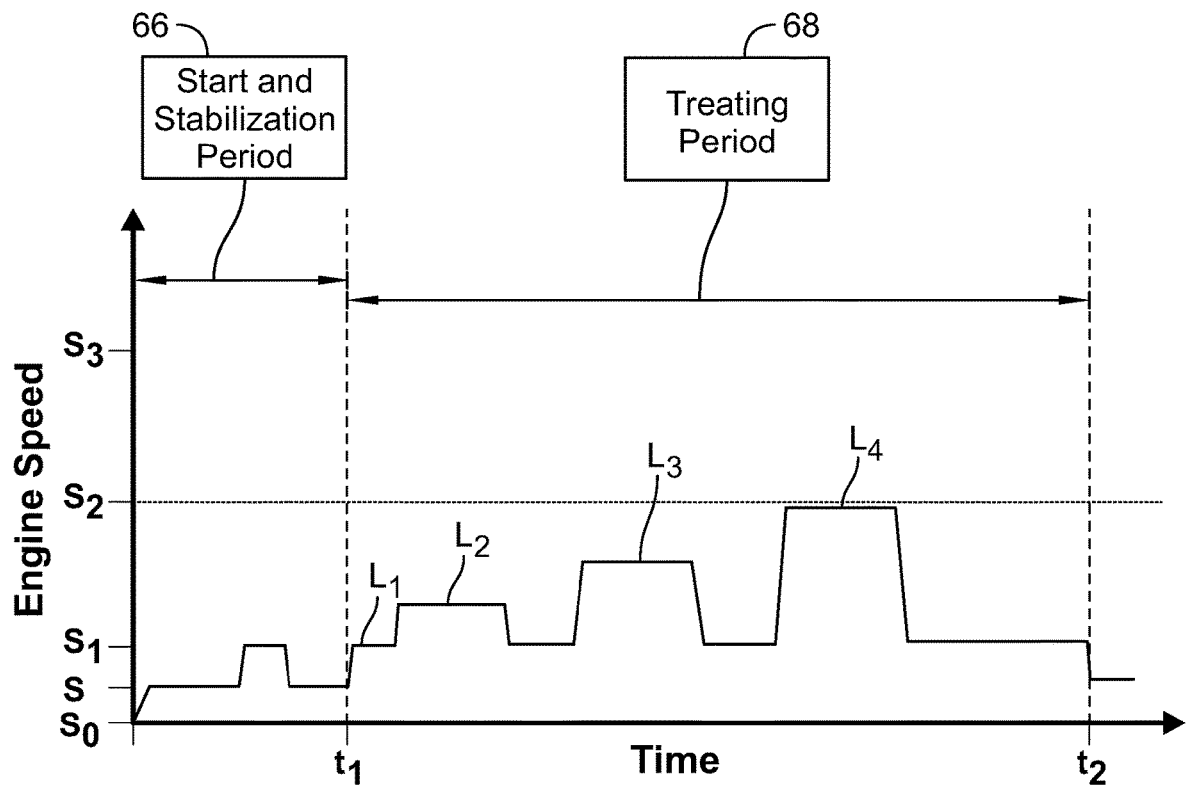
FIG. 13 is a graph of the engine pass-off procedure of FIG. 10 showing another embodiment of the treating period that includes cycling the speed of the engine between the first maximum speed value and a second maximum speed value that is greater than the first maximum speed value.
Figure 14:
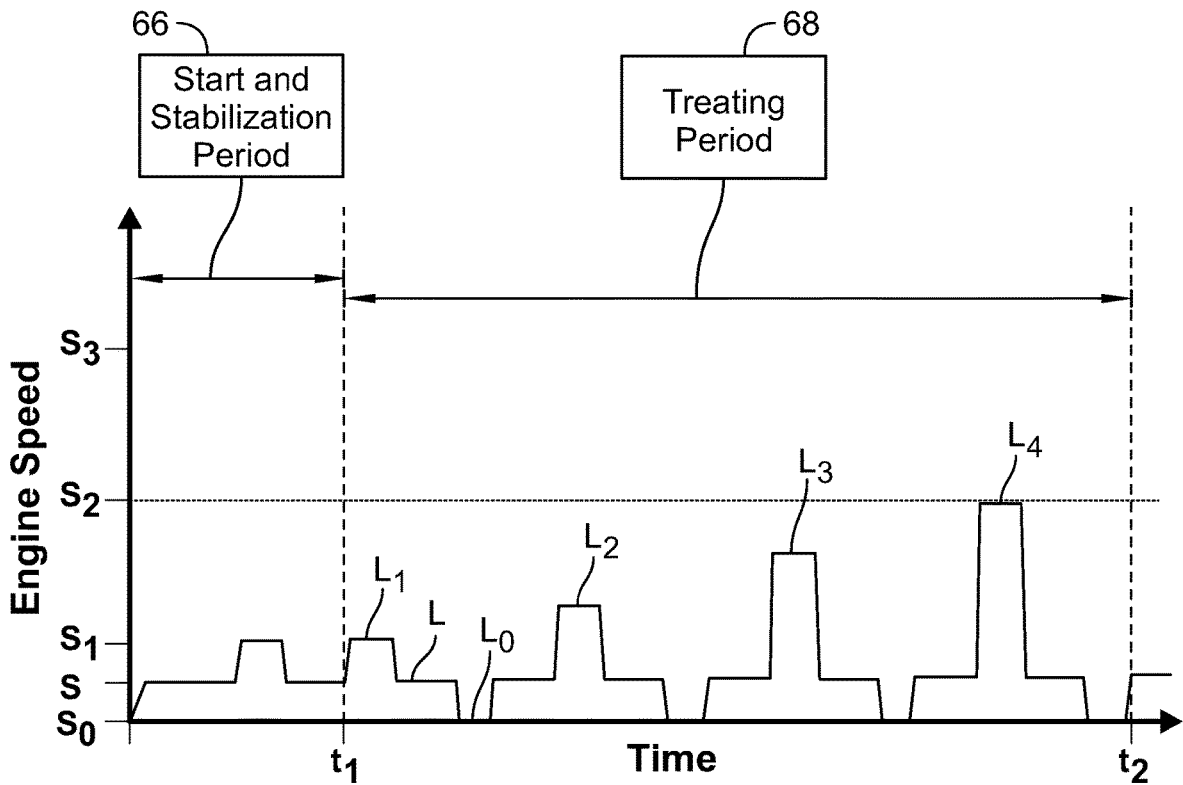
FIG. 14 is a graph of the engine pass-off procedure of FIG. 10 showing another embodiment of the treating period that includes cycles of increasing and decreasing the speed of the engine between the second maximum speed value and the zero value.

After the start and stabilization period 66, the engine pass-off procedure 64 begins the treating period 68. During the treating period 68, the speed of the engine 10 is within a second range having a second maximum speed value $S_2$ as shown in FIGS. 13 and 14. In some embodiments, the second maximum speed value $S_2$ of the second range is equal to the first maximum speed value $S_1$ of the first range as shown in FIGS. 11 and 12. In other embodiments, the second maximum speed value $S_2$ of the second range is greater than the first maximum speed value $S_1$ of the first range and less than a third maximum speed value of the third range during the running-in period 70 as shown in FIGS. 13 and 14.

In other embodiments, the running-in period 70 may be a transient maneuver. In such embodiments, the treating period 68 may be performed after the running-in period 70.

Alternatively, in other embodiments, the treating period 68 may even be performed in the middle of the running-in period 70.

In the illustrative embodiment of FIG. 11, after the engine start and stabilization period 66, the speed of the engine 10 is increased to the first maximum speed value $S_1$ for the duration of the treating period 68. After the treating period 68 is complete, the speed of the engine 10 is decreased before the running-in period 70 starts.

In the illustrative embodiment of FIG. 12, the treating period 68 includes cycles of increasing and decreasing the speed of the engine 10 between the zero value speed $S_0$ and the first maximum speed value $S_1$. After the engine start and stabilization period 66, the speed of the engine 10 is increased to a first speed value $L_1$ and maintained for a preselected period of time. In the illustrative embodiment, the first speed value $L_1$ is equal to the first maximum speed value $S_1$. Then the speed of the engine 10 is decreased and increased in a series of predetermined incremental steps for several cycles for the remaining duration of the treating period 68.

In the illustrative embodiment, the incremental steps are between the first maximum speed value $S_1$ and the minimum speed value S and between the minimum speed value S and the zero value $S_0$. The preselected period of time for each incremental step is about five minutes in the illustrative embodiment.

During the decreasing portion of the cycle, the speed of the engine 10 decreases from the first speed value $L_1$ to a base speed value L as shown in FIG. 12. The base speed value L is equal to the minimum speed value S in the illustrative embodiment. The speed is then maintained for the preselected period of time before the speed is decreased to an engine stop C or the zero value $S_0$. The speed is held at the zero value $S_0$ for the preselected period of time before beginning the increasing portion of the cycle.

During the increasing portion of the cycle, the speed of the engine 10 increases to the base speed value L from the zero value $S_0$, i.e. engine stop. The speed of the engine 10 is then maintained for the preselected period of time before the speed is increased to the first speed value $L_1$. The speed is then maintained for the preselected period of time before repeating the cycle for the remainder of the treating period 68.

In the illustrative embodiments of FIGS. 13 and 14, the treating period 68 includes cycles of increasing and decreasing the speed of the engine 10 within the second range between one of the zero value $S_0$ and the first maximum speed value $S_1$ and the second maximum speed value $S_2$. The second maximum speed value $S_2$ is less than a running-in handling limit in the illustrative embodiment. During the running-in period 70, the loading of the component 24, 26 is at peak engine power such that the ceramic matrix composite material is stressed close to the peak stress state. As such, the second maximum speed value $S_2$ is less than the running-in handling limit.

In the illustrative embodiment of FIG. 13, after the engine start and stabilization period 66, the speed of the engine 10 is increased to the first speed value $L_1$, which is equal to the first maximum speed value $S_1$. The speed is maintained for a preselected period of time at the first speed value $L_1$. Then the speed of the engine 10 is then increased and decreased in a series of predetermined incremental steps for several cycles for the remaining duration of the treating period 68.

For each incremental step, the speed is increased to an intermediate speed value within the second range that is greater than the previous speed value of the last cycle. The speed is maintained for the predetermined set of time before the speed is decreased back to the first speed value $L_1$. The speed is maintained at the first speed value $L_1$ for the predetermined set of time before the next cycle.

In the illustrative embodiment, for the first cycle, the speed of the engine 10 is increased to a second speed value $L_2$ as shown in FIG. 13. The second speed value $L_2$ is greater than the first speed value $L_1$ and less than the second maximum speed value $S_2$. The speed is maintained at the second speed value $L_2$ for the predetermined set of time before the speed is decreased back to the first speed value $L_1$.

Next, the speed is increased to a third speed value $L_3$ as shown in FIG. 13. The third speed value $L_3$ is greater than the second speed value $L_2$ and less than the second maximum speed value $S_2$. The speed is maintained at the third speed value $L_3$ for the predetermined set of time before the speed is decreased back to the first speed value $L_1$.

In the last incremental step, the speed is increased to a fourth speed value $L_3$ is greater than the third speed value $L_3$ and less than the second maximum speed value $S_2$. The speed is maintained at the fourth speed value $L_3$ for the predetermined set of time before the speed is decreased back to the first speed value $L_1$.

In the illustrative embodiment of FIG. 14, after the engine start and stabilization period 66, the speed of the engine 10 is increased to the first maximum speed value $S_1$ and maintained for a preselected period of time. Then the speed of the engine 10 is then increased and decreased to the zero value $S_0$ in a series of predetermined incremental steps for several cycles for the remaining duration of the treating period 68.

For each incremental step, the speed is increased to an intermediate speed value within the second range that is greater than the previous speed value of the last cycle. The speed is maintained for the predetermined set of time before the speed is decreased back to the minimum speed value S. The speed is maintained at the minimum speed value S for the predetermined set of time before the speed is decreased to the zero value $S_0$. The speed of the engine 10 is then maintained at the zero value $S_0$ before the increasing portion of the cycle begins again.

In the illustrative embodiment, for the first cycle, the speed of the engine 10 is increased to the base speed value L from the zero value $S_0$ as shown in FIG. 14. The speed is maintained before the speed is increased to the the second speed value $L_2$. The speed is maintained at the second speed value $L_2$ for the predetermined set of time before the speed is decreased back to the base speed value L. The speed is maintained at the base speed value L before the speed is decreased to the zero value $S_0$.

Next, the speed of the engine 10 is again increased to the base speed value L from the zero value $S_0$, maintained at the base speed value L, and then increased to the third speed value $L_3$ as shown in FIG. 14. The speed is maintained at the third speed value $L_3$ for the predetermined set of time before the speed is decreased back to the base speed value L. The speed is maintained at the base speed value L before the speed is decreased to the zero value $S_0$.

In the last incremental step, the speed of the engine 10 is again increased to the base speed value L from the zero value $S_0$, maintained at the base speed value L, and then increased to the fourth speed value $L_3$ as shown in FIG. 14. The speed is maintained at the fourth speed value $L_3$ for the predetermined set of time before the speed is decreased back to the base speed value L. The speed is maintained at the base speed value L before the speed is decreased to the zero value $S_0$.

For the illustrative embodiments of FIGS. 13 and 14, the last cycle of increasing and decreasing the speed of the engine 10 includes increasing the speed of the engine 10 to the second maximum speed value $S_2$. The speed of the engine 10 is maintained at the second maximum speed value $S_2$ before the decreasing portion of the cycle. In some embodiments, the treating period 68 may include more cycle with different incremental speed values.

Figure 10:
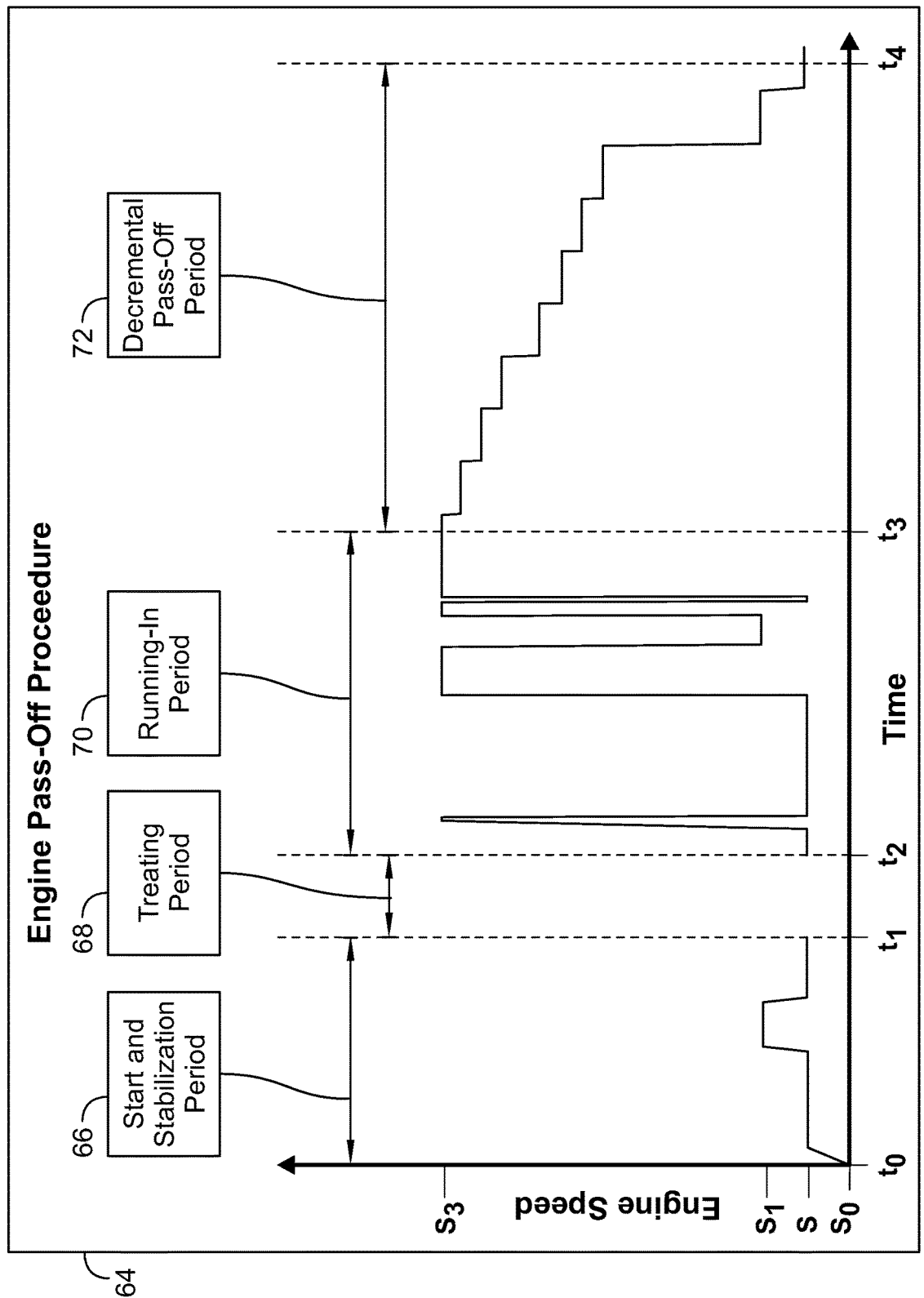
FIG. 10 is a graph of an engine pass-off procedure for treating the ceramic matrix composite component showing the engine pass-off procedure includes altering a speed of the gas turbine engine during an engine start and stabilization period, a treating period wherein the mechanical load is applied to the component to provide the treated ceramic matrix composite component, a running-in period, and a decremental pass-off period.

The treating period 68 has a run time from $t_1$ to $t_2$ as shown in FIGS. 10-14. The run time for the treating period 68 is about sixty minutes. In other embodiments, the treating period 68 may have a run time greater than sixty minutes. The running-in period 70 has a run time from $t_2$ to $t_3$ as shown in FIG. 10, while the decremental pass-off period 72 has a run time from $t_3$ to $t_4$.

In the illustrative embodiments, the preselected period of time of each incremental step is about five minutes. In other embodiments, the period of time may be greater than 5 minutes. In other embodiments, the preselected period of time may be different depending on the speed the engine 10 is set at. For instance, if the speed of the engine 10 is set at the second maximum speed value $S_2$, the preselected period of time may be greater than when the engine 10 is set at the zero value $S_0$.

Figure 8:
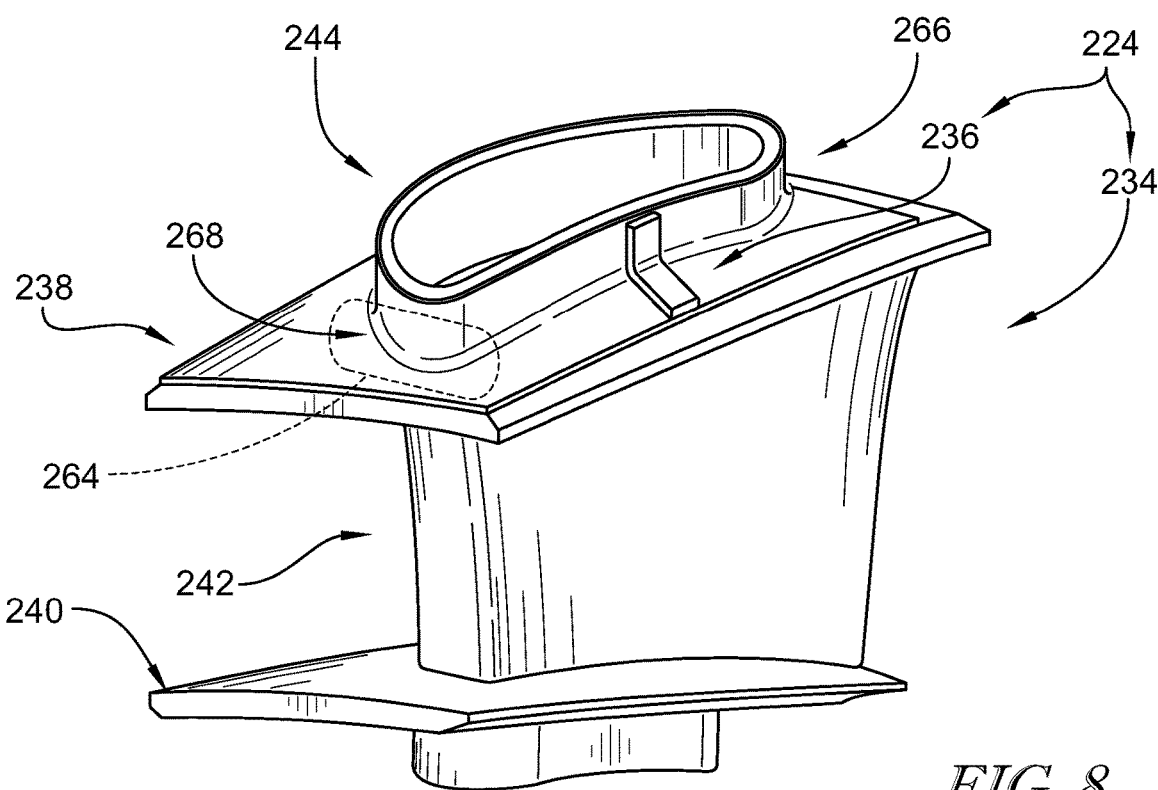
FIG. 8 is a perspective view of another embodiment of a turbine vane adapted for use in the gas turbine engine of FIG. 1 showing the turbine vane includes an outer platform, an inner platform spaced radially inward from the outer platform, an airfoil extending between the outer platform and the inner platform, and a strain concentration feature positioned on the outer platform of the turbine vane in an off-peak stress region instead of a peak-stress region of the turbine vane to reduce stress at the peak-stress region.

Another embodiment of a turbine vane 224 in accordance with the present disclosure is shown in FIG. 8. The turbine vane 224 is substantially similar to the turbine vane 24 shown in FIGS. 1-7 and described herein. Accordingly, similar reference numbers in the 200 series indicate features that are common between the turbine vane 24 and the turbine vane 224. The description of the turbine vane 24 is incorporated by reference to apply to the turbine vane 224, except in instances when it conflicts with the specific description and the drawings of the turbine vane 224.

The turbine vane 224 includes a body 234 and a strain concentration feature 236 as shown in FIG. 8. The body 234 has a peak-stress region 264 and an off-peak stress region 266. The strain concentration feature 236 is located at the off-peak stress region 266. The strain concentration feature 236 is configured to cause stresses to form in the off-peak stress region 266 instead of at the peak-stress region 264 to reduce stress at the peak-stress region 264.

In the illustrative embodiment, the body 234 includes outer and inner platforms 238, 240, an airfoil 242, an outer mount 244, and an inner mount 246 as shown in FIG. 8. The inner platform 240 is spaced apart radially from the outer platform 238. The airfoil 242 extends radially between the outer platform 238 and the inner platform 240. The outer mount 244 extends radially away from the outer platform 238, while the inner mount 246 extends radially away from the inner platform 240.

In the illustrative embodiment, the peak-stress region 264 is located at a leading edge 268 of the vane 224 at the interface between the outer mount 244 and the outer platform 238 as shown in FIG. 8. The strain concentration feature 236 is located axially aft of the peak-stress region 264 in the illustrative embodiment. In other embodiments, the strain concentration feature 236 may be located in other low stress region on the body 234 of the turbine vane 224.

The strain concentration feature 236 extends between the outer mount 244 and the outer platform 238 in the illustrative embodiment. In other embodiments, the strain concentration feature 236 may extend between the inner mount 246 and the inner platform 240.

Figure 9:
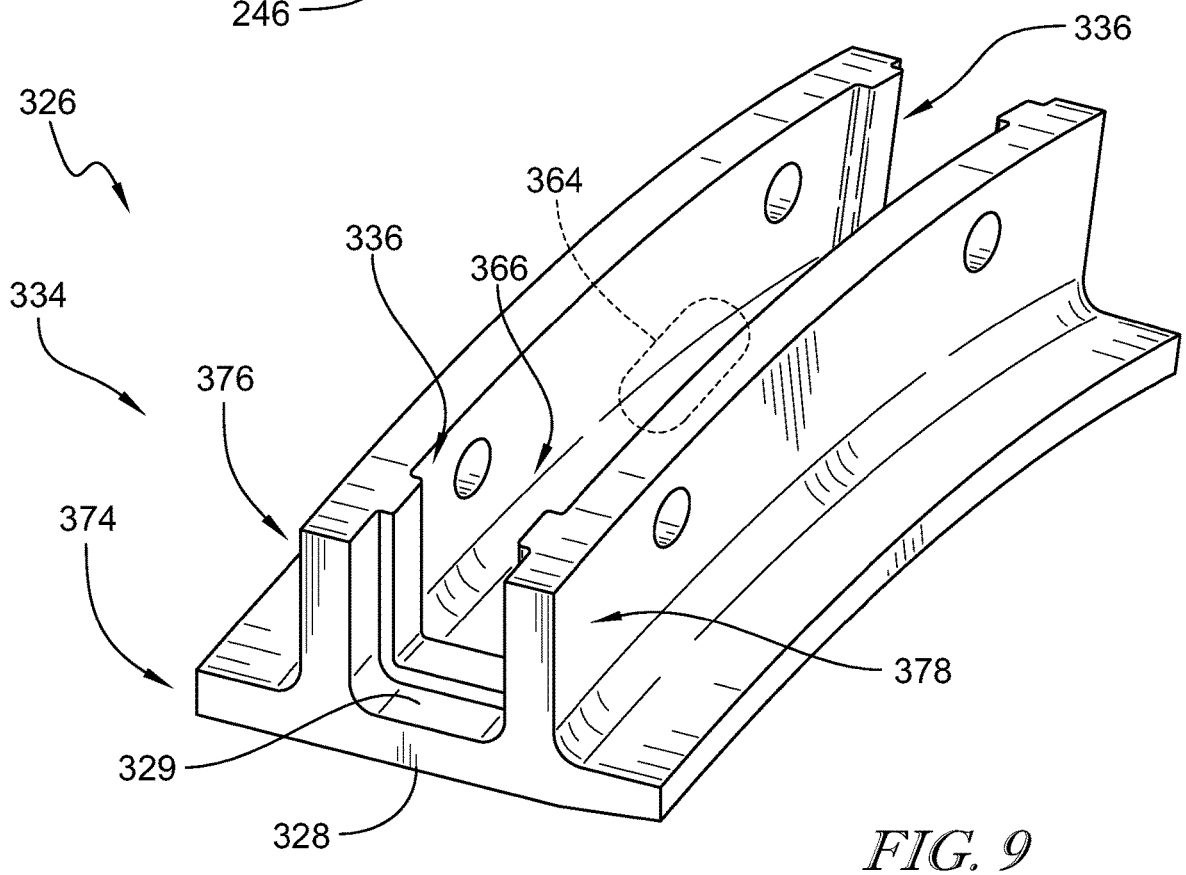
FIG. 9 is a perspective view of a blade track shroud adapted for use in the gas turbine engine of FIG. 1 showing the blade track shroud includes a shroud wall, mount posts that extend radially outward from the shroud wall, and a strain concentration feature positioned on the shroud wall and mount posts in an off-peak stress region instead of a peak-stress region of the blade track shroud to reduce stress at the peak-stress region.

According to another aspect of the present disclosure, another embodiment of a turbine shroud 326 is shown in FIG. 9. The turbine shroud 326 is substantially similar to the turbine shroud 26 shown in FIGS. 1-7 and described herein. Accordingly, similar reference numbers in the 300 series indicate features that are common between the turbine shroud 26 and the turbine shroud 326. The description of the turbine shroud 26 is incorporated by reference to apply to the turbine shroud 326, except in instances when it conflicts with the specific description and the drawings of the turbine shroud 326.

The shroud 326 includes a body 334 and at least one strain concentration feature 336 as shown in FIG. 9. The strain concentration feature 336 is located at an off-peak stress region 366 of the body 334. The strain concentration feature 336 is configured to cause stresses to form in the off-peak stress region 366 instead of at a peak-stress region 364 of the body 334 to reduce stress at the peak-stress region 364.

In the illustrative embodiment, the shroud 326 includes two strain concentration features 336 as shown in FIG. 9. In some embodiments, the shroud 326 may include more than two strain concentration feature 336. In other embodiments, the shroud 326 includes only one strain concentration feature 336.

In the illustrative embodiment, the body 334 includes a shroud wall 374 and mount posts 376, 378 as shown in FIG. 9. The shroud wall 374 extends circumferentially at least partway about the axis 11 and has an inner surface 328 that defines a portion of the gas path 15. Each mount post 376, 378 extends radially outward from an outer surface 329 of the shroud wall 374. The second mount post 378 is spaced apart axially from the first mount post 376 in the illustrative embodiment.

In the illustrative embodiment, the peak-stress region 364 is located at an axial and circumferential center of the shroud 326 between the mount posts 376, 378 as shown in FIG. 9. The strain concentration feature 336 is located axially forward and aft of the peak-stress region 364 in the illustrative embodiment. The strain concentration feature 336 is located on the mount posts 376, 378 and along the outer surface 329 of the shroud wall 374.

In other embodiments, the turbine shroud 326 may have only one mount post 376, 378. In such embodiments, the strain concentration feature 336 may be located on the one mount post and along the outer surface 329 of the shroud wall 374. In other embodiments, the turbine shroud 326 may have another suitable shape with a peak-stress region 364 in a different location.

Figure 15:
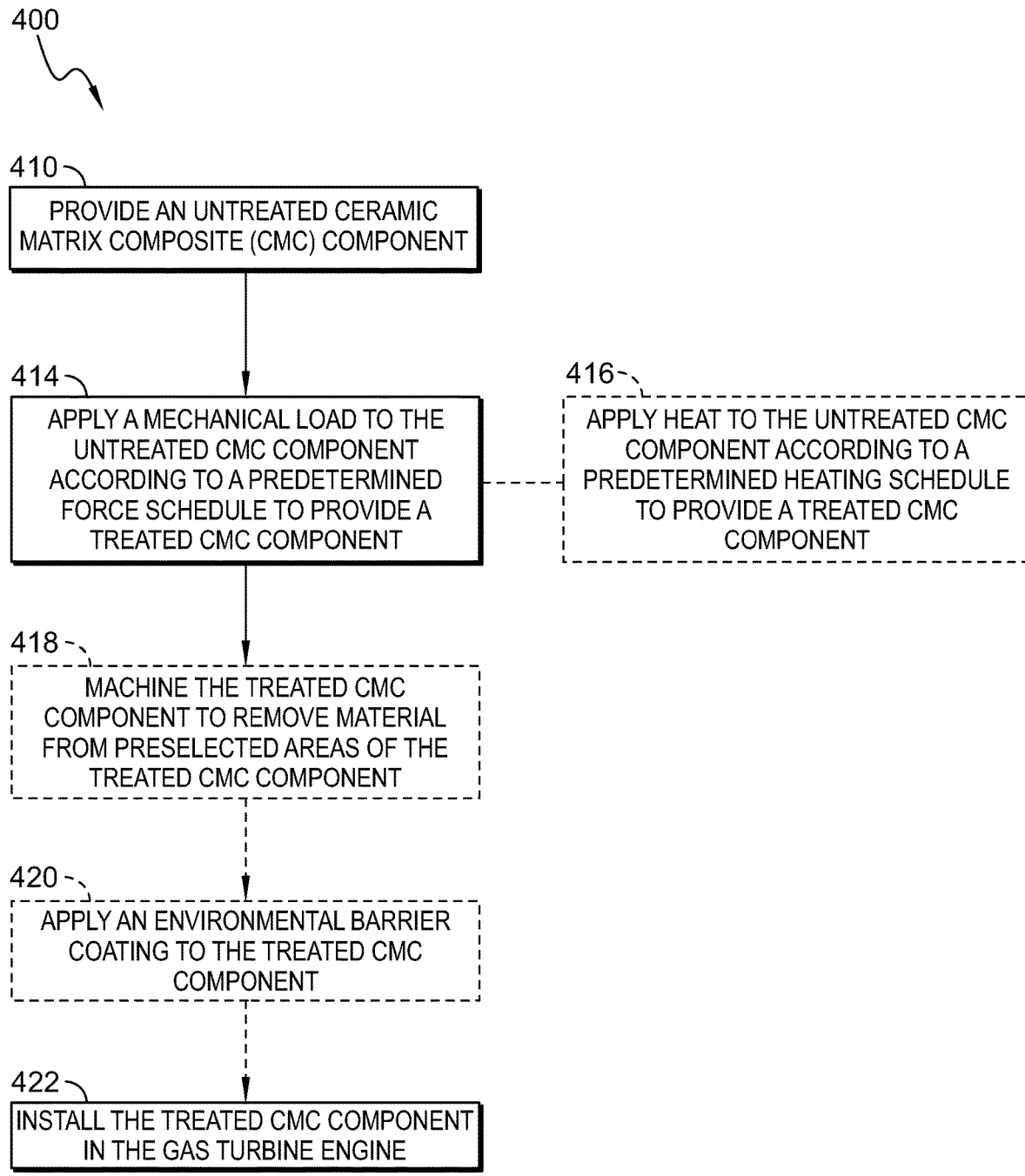
FIG. 15 is a diagrammatic view of a method of treating an untreated ceramic matrix composite component to provide a treated ceramic matrix composite component for use in the gas turbine engine of FIG. 1 showing the method includes applying a mechanical load to the untreated component before installation into the gas turbine engine.

According to another aspect of the present disclosure, a method 400 of treating the untreated ceramic matrix composite components 24, 26, 224, 326 is shown in FIG. 15. The method 400 includes several steps as shown in FIG. 15. The method begins with block 410 in which an untreated ceramic matrix composite component 24, 26, 224, 326 is provided. The untreated ceramic matrix composite component 24, 26, 224, 326 may be formed by laying up 2D layers of ceramic matrix composite material. In some embodiments, the untreated ceramic matrix composite component 24, 26, 224, 326 may be formed by 3D weaving the ceramic matrix composite structure. In other embodiments, the untreated ceramic matrix composite component 24, 26, 224, 326 may be formed using another suitable forming process.

In the illustrative embodiments, the method moves on to block 414 in which the mechanical load is applied to the untreated component 24, 26, 224, 326 according to the predetermined force schedule to provide the treated ceramic matrix composite component. In some embodiments, the method includes the block 416, in which heat is applied to the untreated component 24, 26, 224, 326 according to the predetermined heating schedule. In some embodiments, heat is applied simultaneously with the mechanical load as suggested in FIG. 15. In other embodiments, the heat is applied after the mechanical load or before the mechanical load.

After the treated component is provided, the method may move on to the block 422 in which the treated ceramic matrix composite component is installed in the engine 10. In other embodiments, the method the moves on to block 418 before the treated ceramic matrix composite component 24, 26, 224, 326 is installed in the engine 10. The method may also include block 420 in which the treated component is coated in a coating, such as an environmental barrier coating before the treated component is installed in the engine 10 as suggested by block 422.

Figure 16:
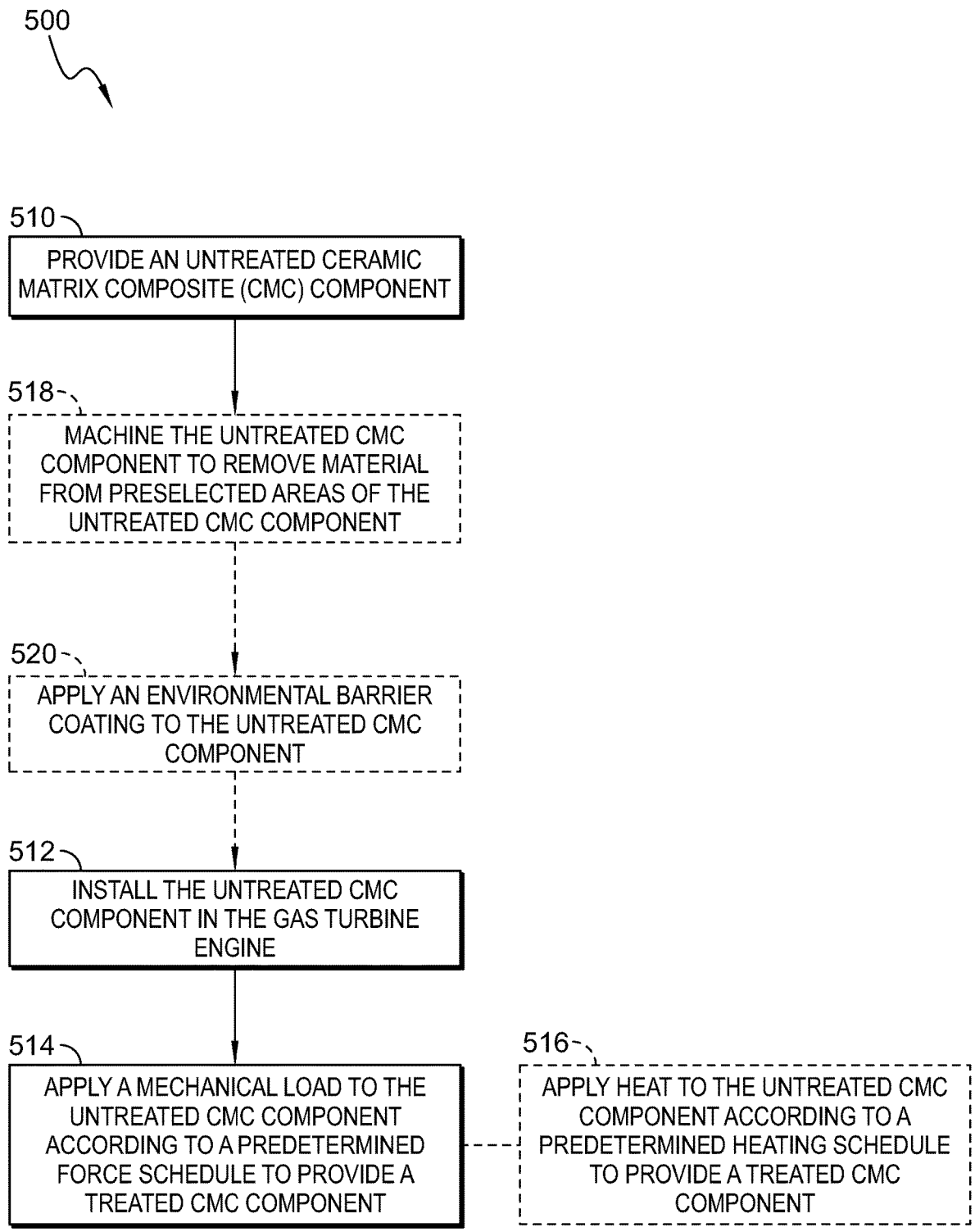
FIG. 16 is a diagrammatic view of another method of treating an untreated ceramic matrix composite component to provide a treated ceramic matrix composite component for use in the gas turbine engine of FIG. 1 showing the method includes installing the untreated ceramic matrix composite component in the gas turbine engine to treat the component.

According to another aspect of the present disclosure, another method 500 of treating the untreated ceramic matrix composite components 24, 26, 224, 326 is shown in FIG. 16. The method 500 includes several steps as shown in FIG. 16. The method begins with block 410 in which an untreated ceramic matrix composite component 24, 26, 224, 326 is provided.

In some embodiments, the method 500 includes block 518 after the untreated component 24, 26, 224, 326 is provided, in which the component 24, 26, 224, 326 is machined to remove material from preselected areas as suggested in FIG. 16. In some embodiments, the method 500 may further include applying a coating to the untreated component 24, 26, 224, 326 as suggested by block 520.

In the illustrative embodiment, the method includes installing the untreated component 24, 26, 224, 326 in the gas turbine engine 10 after the component 24, 26, 224, 326 is provided as indicated by block 512. After the component is installed, the method moves on to block 514 in which the mechanical load is applied to the untreated component 24, 26, 224, 326 according to the predetermined force schedule. In the illustrative embodiment, the predetermined force schedule includes preforming the engine pass-off procedure 64 to treat the component 24, 26, 224, 326.

In some embodiments, the method includes block 516, in which heat is applied to the untreated component 24, 26, 224, 326 according to the predetermined heat schedule. The predetermined heat schedule includes performing the engine pass-off procedure and the heat is applied simultaneously with the mechanical load as suggested in FIG. 16. In other embodiments, the heat is applied aft the mechanical load or before the mechanical load.

The present disclosure relates to ceramic matrix composite (CMC) components 24, 26, 224, 326 for use in gas turbine engines 10. In some embodiments, the design of a component 24, 26 may consider the applied loads (thermo-mechanical and mechanical) and the material properties, which may be invariant as a function of time. As a result, the component 24, 26 may become susceptible to fatigue or overload failure.

Additionally, SiC—SiC CMC materials constitute a range of constituents that may change behaviour and/or properties as a function of mechanical loading and/or temperature. Depending on constituent volume fraction and distribution through the micro-structure, the change of behavior and/or properties may be leveraged to enable a bedding-in effect.

To achieve this bedding-in effect, the present disclosure teaches a gradual introduction of a mechanical load and heat to the CMC component 24, 26, 224, 326 to provide a treated CMC component 24, 26, 224, 326 that limits formation of failure inducing cracks in the component 24, 26, 224, 326 during use of the component in the gas turbine engine. The maximum mechanical load is progressively increased rather than directly applied at first engine operation at maximum pressure/temperature. The mechanical load and heat applied to the component 24, 26 224, 326 therefore increases the integrity or life of the component 24, 26, 224, 326 compared to an as manufactured CMC component 24, 26, 224, 326.

The mechanical load and heat may be applied at pre-installation of the component 24, 26, 224, 326 in the engine 10 or post-installation of the component 24, 26, 224, 326 in the engine 10. In pre-installation embodiments, the CMC component 24, 26, 224, 326 may be mechanically loaded prior to engine assembly as a means of pre-conditioning. In some embodiments, the mechanical load may be applied at manufacture i.e. the component 24, 26, 224, 326 is loaded into a load-test frame 30. In some embodiments, the load-test frame 30 may includes a furnace to increase and/or cycle the component 24, 26, 224, 326 temperature.

In other embodiments, the mechanical load and heat may be applied prior to manufacturing completion of the CMC component 24, 26, 224, 326. For instance, the load and heat may be applied after CMC forming operations, but before the formed component 24, 26, 224, 326 is machined and/or EBC coated. Machining and coating the CMC component 24, 26, 224, 326 before the component 24, 26, 224, 326 is treated may give the component 24, 26, 224, 326 high load protection, but also keep environmental resistance for normal operating loads.

The mechanical load may be applied by discretely applying forces to a plurality of points 60, 61 on the component 24, 26 In other embodiments, the mechanical load may be applied by forces distributed over an area of the surface using pressurized fluid such as, for example, pressurized (and optionally heated) air. In other embodiments, the mechanical load may be applied by flowing air through the gas path 28 or channels 51 of the assembled turbine vane 24 and support structure 50. In other embodiments, the mechanical and heat loads may be applied by driving thermal gradients between the air flowing through the gas path 29 and channels 51 of the assembled turbine vane 24 and support structure 50.

In the illustrative embodiment of FIG. 2, the mechanical load is applied to the component 24 in the CMC assembly or assembled on the associated support structure 50. The arrows 62 indicate high pressure and optionally warm air entering to the channels 51 extending through the support structure 50 to pressurize the CMC vane internal cavity and energize the assembly seals.

Additionally, the arrows 58 indicate slightly lower pressure and optionally hot air entering the gas path 15 formed by the components 24 and the sealing components 52, 54 to load the CMC components 24 against the corresponding load transfer features. As such, the CMC component 24, 26, 224, 326 is mechanical loaded and stressed in an engine like manner.

In the illustrative embodiments of FIGS. 3 and 4, the load vectors 60, 61 indicate the mechanical load applied to the component 24 to exercise peak stresses in the component 24, 26, 224, 326. The mounting supports 32 are configured to support the component 24, while the mechanical load is applied. The loads may be applied through a mechanical loading arrangement such as a whiffle tree to simulate a distributed pressure load or via discrete loading points 60, 61.

In the illustrative embodiment of FIG. 5, the mechanical load is applied by pressurizing the internal cavity 48 of the component 24. The internal cavity 48 may be pressurized directly or via a pressurized bladder to simulate the pressure delta acting across the walls of the component 24.

In the post-installation embodiments, the mechanical load to the surface of the component is applied by operating the gas turbine engine. In some embodiments, the bedding-in effect may be achieved by performing an engine pass-off procedure 64. During the engine pass-off procedure 64, the mechanical load is applied to the components 24, 26, 224, 326 by incrementally increasing the fuel flow rate, the engine pressure ratio, and therefore pressure deltas.

The speed of the engine 10 may be interpreted as stress in the CMC component 24, 26, 224, 326, i.e. there are 2 major contributory factors to the CMC component stress states: mechanical loading through pressure deltas and thermal strains induced through thermal gradients. However, the thermal vs. mechanically induced load split may be tailored during the procedure 64 by altering compressor bleeds, variable inlet guide vane angles, handling bleed valves, etc. for a given fuel flow.

In the illustrative embodiment of FIG. 10, the engine pass-off procedure 64 includes a start and stabilization period 66, a treating period 68, a running-in period 70, and a decremental pass-off period 72. The start and stabilization period 66 includes starting the engine 10 and setting the speed of the engine 10 as a low idle or a minimum speed value S. The engine 10 is then stabilized by running the engine 10 at the low idle S for about ten minutes in the illustrative embodiment. The engine 10 is also set on ground mode and the turbine case cooling is set to a running-in handling turbine pressure ratio schedule.

After the engine 10 is initially stabilized, the flight mode is selected so that the speed of the engine 10 increases to a high idle or first maximum speed value $S_1$. The engine 10 is then stabilized at the high idle $S_1$ for about five minutes. Then the ground mode is selected again to decrease the speed of the engine 10 to the low idle S and stabilized for about five minutes.

After the start and stabilization period 66, the treating period 68 begins. During the treating period 68, the speed of the engine 10 may be within a second range having a second maximum speed value $S_2$ as shown in FIGS. 11-14. In some embodiments, the second maximum speed value $S_2$ of the second range is equal to the high idle $S_1$ as shown in FIGS. 11 and 12. In the illustrative embodiment of FIG. 11, the speed of the engine 10 is set at the high idle $S_1$ for the duration of the treating period 68.

In other embodiments, the treating period 68 includes cycles of increasing the speed of the engine 10 to the second maximum speed value $S_2$ and decreasing the speed of the engine 10 within the second range during the treating period 68 of the engine pass-off procedure 64 as shown in FIGS. 13 and 14.

In other embodiments, the second maximum speed value $S_2$ of the second range is greater than the high idle $S_1$ and less than a third maximum speed value $S_3$ of the third range during the running-in period 70 as shown in FIGS. 10-14. In the illustrative embodiment, the third maximum speed value $S_3$ of the third range is greater than second maximum speed value $S_2$ of the second range as shown in FIG. 10.

The CMC treating period 68 may be as short as a few minutes at each loading state or may be as long as an hour or so total. The elapsed time may be minimised to reduce load on engine test beds, but the benefits associated with CMC part life increases may justify an extra hour during the engine pass-off procedure 64.

In the illustrative embodiments of FIGS. 10-14, the CMC components 24, 26, 224, 326 installed in the gas turbine engine 10 are incrementally loaded prior to the running-in period 70 or the running-in handling period (RiH). The running-in period 70 includes loading towards peak engine power, therefore the CMC component 24, 26, 224, 326 may be stressed close to the peak stress state. As such, the running-in period 70 is performed after the treating period 68 to ensure the CMC component 24, 26, 224, 326 has been treated to provide the treated CMC component 24, 26, 224, 326.

If the treating period 68 is conducted prior to the running-in period 70, then it may be important that the treating period 68 does not interfere with the functional improvements achieved during the running-in period 70. During treating period 68, the acceleration and deceleration rates should be carefully controlled to avoid inadvertent RiH. It is conceivable that RiH loading may be reduced and then be included as an incremental loading step prior to maximum load/stress. In fact, other engine pass-off procedures achieve RiH at throttle positions away from the peak.

In other embodiments, the running-in period 70 may be a transient maneuver. In such embodiments, the treating period 68 may be performed after the running-in period 70. Or, in other embodiments, the treating period 68 may even be performed in the middle of the running-in period 70.

The running-in period 70 includes increasing the speed of the engine 10 to a third maximum $S_3$. The third maximum speed value $S_3$ is greater than the first and second speed values $S_1$, $S_2$.

In the illustrative embodiments of FIGS. 8 and 9, the components 224, 326 may include a design feature or strain concentration feature 236, 336 to intentionally "seed" the component 224, 326 at or near critical locations so as to provide a type of overstress protection. The strain concentration features 236, 336 may be positioned away from peak thermal gradients (i.e. peak-stress regions 264, 364), where large strains are already developed.

Alternatively, the features 236, 336 may be situated close to peak thermal gradients such that damage is focused on this region. The feature 236, 336 may act as a fuse, whereby strain accumulation i.e. damage is initially localized to this region 266, 366, mitigating the damage in areas more susceptible to environmental deterioration and/or further strain during engine running.

In the illustrative embodiments, the strain concentration features 236, 336 are located in off-peak stress regions 266, 366, concentrating strain derived from mechanical loading (i.e. pressures and thermal gradients). In reality, the stress states are complex interactions of multi-axial stresses derived from both thermal and mechanical boundary conditions and feature size, shape, quantity, etc.

The bedding-in effect in the components 24, 26, 224 326 creates a localized compliance in the CMC through the internal generation of defects. This compliance serves as an additional inhibitor to crack propagation by distributing the energy of the crack into multiple smaller, more benign crack fronts as opposed to a single, more energetic (and therefore more damaging) crack tip.

The formation of smaller, benign cracks in the CMC component 24, 26, 224, 326 may be benefited by a change in material deformation behaviour (e.g. silicon ductile to brittle transition will affect local stress redistribution/crack blunting mechanism). For materials incorporating reactive melt infiltration Silicon alloys, this phase exhibits a ductile to brittle transition around 565 deg C., to exercise this effect this temperature may be exceeded in the bedding-in process.

The predetermined force and heat schedules may be tailored to introduce multiple fine cracks, rather than fewer (or a single) large crack that may be advantageous from an environmental ingress and subsequent part structural capability deterioration perspective. This relaxes the local strains in the vicinity of the micro-cracks and reduces the gross exposure to environmental factors which impact the integrity of the material.

The bedding-in effect may also originate in differential constituent creep rates leading to constituent load redistribution, which may enable stress redistribution/residual stress relaxation. Creep is a time dependent phenomenon and hence the cycles of increasing and decreasing the mechanical load and heat in incremental steps may provide opportunity for more uniform global load sharing. Additionally, incrementally stepping the load prior to peak loading may increase crack tip energy dissipation, reducing the extent of micro-cracking relative to a monotonically loaded part.

Constituent modulus variation with temperature may also lead to constituent load transfer on cycling. This may introduce micro-cracking due to the relative strains of the constituents, which may be introduced in a more controlled manner through stepping the load and/or through cycling at magnitudes below the peak loading. Additionally, tribological bedding-in at CMC part interfaces may help reduce peak loading by plastically deforming metallic interfacial features. For example discrete load pads may introduce mechanical loads that become more distributed over the pad, reducing the stresses.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A method of treating a component adapted for use in a gas turbine engine, the method comprising
   forming a component comprising ceramic matrix composite materials to provide a ceramic matrix composite component adapted to be installed in the gas turbine engine,
   treating the component after forming the component to provide a treated ceramic matrix composite component that limits formation of failure inducing cracks in the component during use of the component in the gas turbine engine, and
   installing the treated ceramic matrix composite component into the gas turbine engine after the step of applying the mechanical load to the surface of the component,
   wherein the treating step includes at least one of applying a mechanical load to a surface of the component according to a predetermined force schedule and applying heat to the component according to a predetermined heating schedule to create localized compliance in the treated ceramic matrix composite component that limits formation of failure inducing cracks in the component.

2. The method of claim 1, further comprising applying heat to the component during the step of applying the mechanical load to the surface of the component.

3. The method of claim 1, wherein the step of applying the mechanical load to the component includes applying a solid tool to the component or a pressurized fluid to the component to provide at least one of discrete forces to a plurality of points on the surface of the component and distributed forces over an area of the surface of the component.

4. The method of claim 1, wherein the method further comprises at least one of removing material from the surface of the component and applying an environmental barrier coating to the surface of the component after the step of applying the mechanical load to the surface of the component.

5. The method of claim 1, wherein the predetermined force schedule includes repeating cycles of increasing a force applied to the surface of the component to a predetermined maximum force and decreasing the force applied to the surface of the component.

6. The method of claim 5, wherein the step of decreasing the force applied to the surface of the component includes decreasing the force to a zero value.

7. The method of claim 1, wherein the predetermined force schedule includes increasing a force applied to the surface of the component to a predetermined maximum force in a series of predetermined incremental steps.

8. The method of claim 5, wherein the predetermined maximum force is less than the forces experienced by the component during peak engine operation.

9. The method of claim 5, wherein the repeating cycles of increasing the force applied to the surface of the component includes increasing the force applied to the surface of the component to the predetermined maximum force in a series of incremental steps of a predetermined force increment and holding the predetermined force increment for a first predetermined set of time before the force is increased.

10. The method of claim 9, wherein the repeating cycles of decreasing the force applied to the surface of the component includes decreasing the force applied to the surface of the component between each incremental increase to a predetermined minimum force.

11. The method of claim 9, wherein the predetermined heating schedule includes repeating cycles of increasing heat applied to the surface of the component to a predetermined maximum temperature and decreasing the heat applied to the surface of the component.

12. The method of claim 11, further comprising repeating the cycles of increasing and decreasing the heat while repeating the cycles of increasing and decreasing the force applied to the surface of the component.

13. The method of claim 12, wherein the predetermined maximum temperature is less than the temperature experienced by the component during peak engine operation.

14. The method of claim 12, wherein the repeating cycles of increasing the temperature applied to the surface of the component includes increasing the temperature applied to the surface of the component to the predetermined maximum temperature in a series of incremental steps of a predetermined temperature increment and holding the predetermined force increment for a first predetermined set of time before the force is increased.

15. The method of claim 1, further comprising assembling the component on a support structure that comprises metallic materials before the component is treated, the support structure configured to support the component as if the component was installed in the gas turbine engine.

16. The method of claim 15, wherein the support structure includes an outer carrier arranged radially outward of the component that extends at least partway circumferentially about an axis, an inner carrier arranged radially inward of the component that extends at least partway circumferentially about the axis, and a support spar that extends radially inward from the outer carrier through an interior cavity of the component to the inner carrier, the support spar configured to the force reactive force load from the component when the mechanical load is applied.

* * * * *